(12) United States Patent
Brown et al.

(10) Patent No.: US 10,083,611 B2
(45) Date of Patent: Sep. 25, 2018

(54) METHOD FOR ENABLING PARTICIPATING MEMBERS TO EQUITABLY AND EFFICIENTLY DISSEMINATE PARKING LOCATION INFORMATION IN A TIMELY MANNER

(71) Applicant: Christopher W. Brown, New York, NY (US)

(72) Inventors: Christopher W. Brown, New York, NY (US); Malcolm Barnes, Farmington, NY (US)

( * ) Notice: Subject to any disclaimer, the term of this patent is extended or adjusted under 35 U.S.C. 154(b) by 0 days.

(21) Appl. No.: 15/341,673

(22) Filed: Nov. 2, 2016

(65) Prior Publication Data
US 2017/0169708 A1    Jun. 15, 2017

Related U.S. Application Data

(60) Provisional application No. 62/249,726, filed on Nov. 2, 2015.

(51) Int. Cl.
*G08G 1/14* (2006.01)
*H04L 29/08* (2006.01)

(52) U.S. Cl.
CPC .............. *G08G 1/144* (2013.01); *H04L 67/02* (2013.01)

(58) Field of Classification Search
CPC .......... G08G 1/14; G08G 1/141; G08G 1/143; G08G 1/144; G08G 1/145; G08G 1/146; G08G 1/147; G08G 1/148
See application file for complete search history.

(56) References Cited

U.S. PATENT DOCUMENTS

| | | | |
|---|---|---|---|
| 2003/0162536 A1* | 8/2003 | Panico | G08G 1/14 455/456.3 |
| 2013/0219289 A1* | 8/2013 | Anton | G06F 3/01 715/748 |
| 2017/0025009 A1* | 1/2017 | Hakeem | G08G 1/144 |
| 2017/0092130 A1* | 3/2017 | Bostick | G08G 1/143 |
| 2017/0186056 A1* | 6/2017 | Amin | G06Q 30/0284 |

* cited by examiner

*Primary Examiner* — Laura Nguyen
(74) *Attorney, Agent, or Firm* — Cozen O'Connor

(57) ABSTRACT

A method system and social platform for distributing parking location information via the social platform to community members of the social platform to enable community members to acquire a parking spot, wherein a community of street parking motorists who alternately need or have parking spot information is created, community members simultaneously broadcast parking spot information (Beacons) and parking spot requests, where a single motorist who will soon be relinquishing his/her spot is matched to another motorist within a target radius who has requested a parking spot, and where a community member can monitor a dashboard that reflects real time matchmaking activity based on several factors including tier association, spot/profile alignment and queue entry order such that participating members can equitably and efficiently disseminate parking location information in a timely manner.

10 Claims, 14 Drawing Sheets

Community Snapshot

FIG. 2    High Level Swim lanes

METHOD FOR ENABLING PARTICIPATING MEMBERS TO EQUITABLY AND EFFICIENTLY DISSEMINATE PARKING LOCATION INFORMATION IN A TIMELY MANNER

CROSS-REFERENCE TO RELATED APPLICATION

This application claims priority from U.S. Provisional Application Ser. No. 62/249,725 filed Nov. 2, 2015, the content of which is hereby incorporated by reference in its entirety.

BACKGROUND OF THE INVENTION

1. Field of the Invention

The present invention relates to vehicle parking and, more particularly, to a method system and social platform for enabling participating members to equitably and efficiently disseminate parking location information in a timely manner.

2. Description of the Related Art

In general, the operation of a vehicle in densely populated or urban areas can be expensive and time consuming. In many of these areas, the price of garage space is prohibitively expensive. Often, there is an overall perception that there are more vehicles than affordable parking solutions.

An increase of the urban population entails a corresponding increase in the number of motor vehicles. As a result, motorists will spend significantly more time and resources inefficiently searching for a place to park. In one urban area within the United States, e.g., New York City (NYC) or Manhattan, the search for a place to park can take anywhere from approximately 20 minutes to one hour, depending on the time of day. Various searching methods emerged shaped uniquely for each driver by gut feel and past success, but at a high level most strategies were divided between a "sit-and-wait" vs a "circling" approach. When queried, almost all drivers express stress, not time or fuel consumption, as the worst part of locating a parking spot or place to park.

In the example of Manhattan as the urban setting, certain statistical variable are known from Internet websites, such as ParkMe. For example, the average hourly parking in a region of Manhattan known as the Upper West Side (UWS), the fee for parking a vehicle is $17.34 per hour, the average daily parking fee is $27.60 per day, the average overnight parking fee is $37.51 per night, the average monthly parking is $574.71, and the average fee for on street metered parking is $1 to $5.00 for a time period of one hour.

In Manhattan, moreover, the population of this section of New York City is dynamic and fluctuates based on weekday, weekend weeknight. For example, on a weekday the population of Manhattan can comprise 1.6 million commuting workers, 778,000 visitors and 1.46 million residents. This number changes on the weekend, where the population can comprise 565,000 commuting workers, 778,000 visitors and 1.54 million residents. Lastly, on a weeknight the population of Manhattan can comprise zero commuting workers, 436,000 visitors and 1.58 million residents. Of the Manhattan population, approximately 16.2% commute by car, approximately 23% own cars or motor vehicles, and there are roughly 3.4 to 4.4 million locations available for parking on the streets of NYC.

The parking situation in various urban areas, such as NYC or Manhattan, has given rise to the question of whether technology can be used to help alleviate the problem. Currently, several conventional solutions are offered to combat the parking problem, e.g., Primospot, Spot Hero, Streetline, Monkey Parking, SpotSwitch and Haystack.

Each of these solutions fall into one of several categories, e.g., the "Garage Solution", "Supplemental Hardware Methods", the "Acquire and Sell model" and the "Community Model". While these models or conventional solutions do provide a remedy to parking within an urban environment, they do nevertheless fail to adequately address the problem.

Of the Garage Solutions, the best of these services allow a motorist to secure garage spots while in transit and at a discount. It is apparent what is provided by the garage solution provides little with respect to locating an on-street location at which to park.

Streetline and others have adopted hardware assisted solutions. However, these solutions are complex and require the "buy-in" of municipalities. Moreover, these solutions are heavily dependent upon VC capital and manufacturing.

With respect to the "Acquire and Sell Models", Monkey-parking requires a holder of a parking location to auction their spot to the highest bidders, while with ParkModo holders of parking locations are paid to relinquish their parking spots to ParkModo which then auctions the spots to the highest bidder. Besides incurring the wrath of municipalities and bloggers, it is highly doubtful these conventional methods adequately accounts for user context. Moreover, these solutions are too slow to meet the needs of most users.

Another "Acquire and Sell Model" is Heystack. The drawbacks of this solution are clear because this model is now "shuttered" under municipal pressure; parking location holder impermissibly sold parking spots to each other.

Lastly, the community models iSpotSwap and Spotswitch broadcast parking spot availability to everyone instead of controlling the process. By broadcasting parking location availability to everyone, however, these conventional solutions increase stress for the many while rewarding the few.

SUMMARY OF THE INVENTION

Disclosed is a method, system and social platform for enabling participating members to equitably and efficiently disseminate parking location information in a timely manner.

The method and system seeks to create a community of street parking motorists who alternately need or have parking spot information. Community members simultaneously broadcast spot info (Beacons) and spot requests. In accordance with the invention, a single motorist who will soon be relinquishing his/her spot is matched to another motorist within a target radius who has requested a spot. Community members can monitor a dashboard that reflects real time matchmaking activity based on several factors including tier association, spot/profile alignment and queue entry order.

In accordance with the invention, all informer beacons whose locations fall within an established seek radius are identified. Parking spots are then assigned to parking spot requesters/seekers based on a matching methodology that considers tier, queue position, car size, parking spot requester/seeker time in relation to a parking spot availability estimate, as well as other variables.

The parking spot requester/seeker is informed of a match and the requestor/seeker manually accepts or rejects the offer. If the requestor/seeker accepts the match, then turn-by-turn instructions to the parking spot are provided to the requestor/seeker. It is contemplated that a parking spot requestor may accept a parking spot but then find another one on the way to their requested parking spot? Therefore, if a requestor/seeker decides to take another parking spot then, as soon as it becomes feasible, the requestor/seeker releases their requested parking spot request so it can be reassigned.

The method and system of the invention accommodates situations in which a beacon is sent out, a match is obtained but the seeker never shows to claim the parking spot. This is accounted for as follows. Once a beacon has been accepted, a sender (informer) becomes obligated to hold the parking spot through the length of time associated with a transfer grace period. The method and system of the invention allows a sender/informer to track the requester/seeker who accepted the issued beacon.

In general, there is a preferred way to inform others about a parking spot that is about to be vacated. Ideally the beacon sender (informer) should not wait until arriving at their car to send the beacon. Beacons should be sent before returning to the car but not until making a reasonably accurate estimate of their departure time. Thus, informing from a car should be avoided for two reasons. That is, the recommended approach is to send a beacon as soon as it becomes possible to approximate a departure but before the actual need to proceed to the vehicle. (Send the beacon after you get the check but before you pay it, for example). Preferably, a beacon is sent, the beacon sender (informer) gradually proceeds to their car, where a community member is already queued up waiting for the parking spot. After an exchange of acknowledgements, followed by a parking spot transfer, both parties can then proceed on their way.

There are instances in which a beacon is sent, but no response occurs. This can occur depending on the time of day or location. Here, however, the method and system has a built in incentive program, whereby if the beacon is kept open for a minimum live beacon period then the beacon sender (informer) is awarded points for their effort. The amount of points gradually diminishes with the frequency of non-response beacons.

Parking spots are assigned in accordance with a matching algorithm that matches beacons with spot requestors/seekers. Essentially, this is a first come first serve model but the system keeps track of both tiers and evaluates first tier requests before considering second tier requests. The system also takes into account user profiles. Community members can also specify a favorite parking spot referred to as a "Sweet spot". Sweet spots represent the requesters "dream" or most optimal spot and should not change often. If a community member has specified a sweet spot and the beacon contains the same coordinates, the matching algorithm may provide preferential treatment to that community member.

A community member may travel outside of their parking spot radius. Thus, if the community member executes a turn that places them outside of their parking spot search radius, then the system will send a warning. However, the system does not change the parking spot search radius that was derived from the profile of the community member and their chosen location when the request was sent out. It is possible to modify the parking spot search radius at any time without affecting a community member's place in the queue. There is also the chance that a community member can set a location mark, but then does not have enough time to complete the parking spot transfer process.

Initially, a community member is provided with a monthly allotment of free seek requests, with a membership fee being charged after the community member has exhausted their monthly allotment. More specifically, membership begins, not with subscription, but with profile creation. Upon successful profile creation, a member is entitled to unlimited spot informs but only a limited amount of monthly spot requests. The system will inform a community member when they have reached their monthly allotment and ask if they would like to unlock unlimited seeks for the month. If the member responds affirmatively, then they will be billed a monthly fee that will in-turn unlock unlimited seek requests. This allows flexibility for those community members who may be traveling or who do not always reach their monthly free allotment. Regardless of subscription status, the participation rate of a community member remains active. In this way, community members can boost their participation score by informing even if they decide not to go beyond their allotment of free seek requests. The only way to discontinue community membership is to delete or deactivate a profile.

It is clear that if the holders of parking locations are provided with the ability and incentive, they will make a reasonable effort to inform other motorists about the availability and location of their parking location or spot without the need for financial incentive. As a result, the uncertainty and wasted resources currently required during the acquisition of street parking in metropolitan areas will be reduced such that the stress and uncertainty involved in securing a parking spot in a congested metropolitan environment is likewise reduced. As a result, municipalities are assisted to reduce traffic and pollution, motorists are helped to reduce stress and fuel consumption, a measure of fairness is added to what can be a seemingly unfair process.

Other objects and features of the present invention will become apparent from the following detailed description considered in conjunction with the accompanying drawings. It is to be understood, however, that the drawings are designed solely for purposes of illustration and not as a definition of the limits of the invention. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained below in greater detail with respect to exemplary embodiments that refer to the enclosed figures, in which.

DETAILED DESCRIPTION OF THE EXEMPLARY EMBODIMENTS

Figure 1:
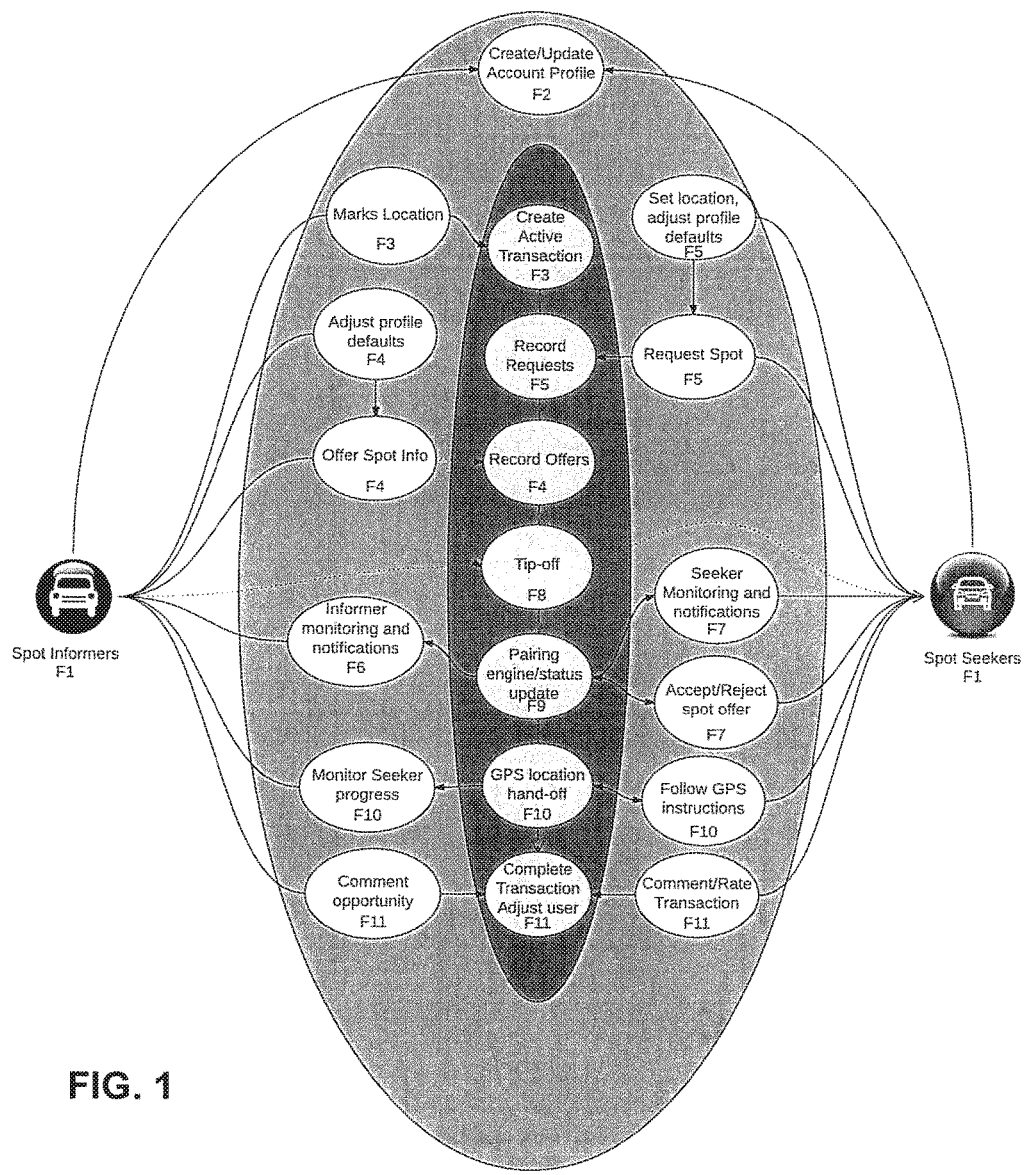
FIG. 1 is schematic block diagram of the implementation of the method in accordance with the invention in an exemplary user community.

FIG. 1 is schematic block diagram of the implementation of the method in accordance with the invention in an exemplary user community. With reference to FIG. 1, parking spots are obtained in the following manner. If, within this community, a user (spot informer or spot seeker) has not established a profile, then they will do so to reflect the vehicle(s) that they drive, their default search radius, and their favorite spot location if appropriate. Upon establishing a profile, a request is then easily sent by pressing a "hot key" sequence or pressing a "request spot" button provided on a graphical interface ("GUI") of their mobile device. In accordance with the invention, all informer beacons whose locations fall within an established seek radius are identified. Parking spots are then assigned to parking spot requesters/seekers based on a matching methodology that considers tier, queue position, car size, parking spot requester/seeker time in relation to a parking spot availability estimate, as well as other variables.

The parking spot requester/seeker is informed of a match and the requestor/seeker manually accepts or rejects the offer. If the requestor/seeker accepts the match, then turn-by-turn instructions to the parking spot are provided to the requestor/seeker. Here, it should be noted it is the requestor's/seeker's responsibility to arrive at the parking spot by a stated vacate time. For this reason, requests are preferably made only when the requestor/seeker is physically close enough to the requesting radius to travel to a parking spot should one be assigned.

It is contemplated that a parking spot requestor may accept a parking spot but then find another one on the way to their requested parking spot? Therefore, if a requestor/seeker decides to take another parking spot then, as soon as it becomes feasible, the requestor/seeker releases their requested parking spot request so it can be reassigned. Release of the parking spot also removes the requestor from a parking spot seeking queue to ensure assistance is no longer needed in accordance with the invention before their place in the queue is relinquished.

The method and system of the invention accommodates situations in which a beacon is sent out, a match is obtained but the seeker never shows to claim the parking spot. This is accounted for as follows. Once a beacon has been accepted, a sender (informer) becomes obligated to hold the parking spot through the length of time associated with a transfer grace period. The method and system of the invention allows a sender/informer to track the requester/seeker who accepted the issued beacon. Based on the requestor's location, a beacon sender (informer) may decide to hold the parking spot beyond the transfer grace period but they not obligated to do so. If the vacate time arrives and expires and the requester/seeker fails to arrive, then credit will be provided to the beacon sender (informer) for their attempt to inform the community about a parking spot even though a transfer failed to occur. That is, if the community member held their parking spot through the transfer grace period and the driver has not shown, then the community member may pull away from their parking spot with the understanding they will obtain credit for a successful inform.

In general, there is a preferred way to inform others about a parking spot that is about to be vacated. Ideally the beacon sender (informer) should not wait until arriving at their car to send the beacon. Beacons should be sent before returning to the car but not until making a reasonably accurate estimate of their departure time. Thus, informing from a car should be avoided for two reasons. First, doing so alerts non-community members to the fact that you a parking spot is about to be vacated before the informer can alert community members. This can set the stage for unpredictable transfer outcomes. Second, informing from a car places the beacon sender (informer) in the position of having to wait for the process to consummate from their car. The preference to remain productive while the process unfolds is thus clear to the skilled person. That is, the recommended approach is to send a beacon as soon as it becomes possible to approximate a departure but before the actual need to proceed to the vehicle. (Send the beacon after you get the check but before you pay it, for example). Preferably, a beacon is sent, the beacon sender (informer) gradually proceeds to their car, where a community member is already queued up waiting for the parking spot. After an exchange of acknowledgements, followed by a parking spot transfer, both parties can then proceed on their way.

There are instances in which a beacon is sent, but no response occurs. This can occur depending on the time of day or location. Here, however, the method and system has a built in incentive program, whereby if the beacon is kept open for a minimum live beacon period then the beacon sender (informer) is awarded points for their effort. The amount of points gradually diminishes with the frequency of non-response beacons.

Only a seeker/requestor who has been paired to a beacon obtains detailed information associated with that beacon. All other community members see real-time seek and beacon activity on their dashboards or GUI. The dashboard or GUI will show members how many active beacons and requests are in play at any one moment in time for their target area. From this information community members, can derive how active the community is within the target search radius. The dashboard or GUI will hint at spot movement activity in the target area and provide specific information about pairing odds.

The method and system provides two user tiers, and these tiers affect the ability to attain or pass on parking spot information? The two tiers are called 'First tier" and "Second tier". First tier is a non-exclusive tier, i.e., anyone can attain and hold first tier with a little effort. To stay in first tier, a community member must maintain an appropriate balance between inform and seek activities. Having second tier status does not affect the ability to inform, but it can have a significant impact on the ability to be matched to spots. All spot requests are analyzed against requests in the first tier before second tier requests are considered. The method and system is configured and operates in an optimal manner if all community members are in first tier. For that reason, the method and system is configured such that all members who contribute easily remain in the first tier.

It should therefore be apparent there is a desire to avoid the second tier, which is in fact easy to do. A community member is provided with the ability to check their profile at any time to see where they stand. The system also sends warnings if a community member gets close to slipping into the second tier. If a community member discovers they are leaving the first tier, it means that the community member is successfully "seeking" more than they are successfully informing. Thus, to avoid the second tier, a simply rule must be followed. That is, give assistance to get assistance.

Notwithstanding the movement between tiers during community membership, all community members starts in the first tier (Tier 1), which is where most active members stay. Over time, if a community member successfully acquires spots using the method in accordance with the invention but for one reason or another do not successfully transfer spots, then those community members will eventually slip into the second tier. It is desirable to remain in Tier 1 because all Tier 1 requests are reviewed for pairing before any Tier 2 request are considered. Many conventional systems appear to naturally gravitate toward a bell shaped curve with a few elite members at the top, the majority in the middle and a few stragglers at the bottom. The system in accordance with the invention is not configured in this manner. The system operates optimally when all community members are in the same tier and the process becomes essentially first come first serve. The second tier exists for those who would benefit from but not contribute to the community. Because the method and system operates best when everyone is in the first tier, the present invention is configured to make it easy to stay in Tier 1 and return to it should a community member drop out.

Parking spots are assigned in accordance with a matching algorithm that matches beacons with spot requestors/seekers. Essentially, this is a first come first serve model but the system keeps track of both tiers and evaluates first tier requests before considering second tier requests. The system also takes into account user profiles. If, for instance, a beacon was sent out by a community member driving a Mini cooper and the only first tier seeker happens to be driving a Chevy Suburban but a second-tier member is driving a Chevy Volt, the system is biased such that the parking spot will be awarded to the Chevy Volt driver even though the first-tier request was initially considered. Community members can also specify a favorite parking spot referred to as a "Sweet spot". Sweet spots represent the requesters "dream" or most optimal spot and should not change often. If a community member has specified a sweet spot and the beacon contains the same coordinates, the matching algorithm may provide preferential treatment to that community member.

A community member may travel outside of their parking spot radius. Thus, if the community member executes a turn that places them outside of their parking spot search radius, then the system will send a warning. However, the system does not change the parking spot search radius that was derived from the profile of the community member and their chosen location when the request was sent out. It is possible to modify the parking spot search radius at any time without affecting a community member's place in the queue.

There is also the chance that a community member can set a location mark, but then does not have enough time to complete the parking spot transfer process. For example, there are times when sending a beacon is going to be inconvenient. The community member can either pull away from the parking spot, in which case the system will try to detect that the community member has left their parking spot, or they can perform a "Zero Beacon". A Zero Beacon means that the parking spot is immediately available and that the community member is not waiting to complete a transfer. In either case, this activates a "Tip-Off" function. A Tip-Off, similarly to the tip of performed at the start of a basketball game, alerts two seekers in the immediate area that a parking spot is likely to become available. The Tip-Off then sends both seekers the coordinates of the parking spot with the understanding that an investigation may be worthwhile. The two seekers understand that this is a spot tip off and not an exclusive transfer. The two seekers are free to investigate but neither forfeit their positions in the queue. If one of the seekers obtains the parking spot, then they can either release their request or the system will make that determination. Gaining a parking spot in this manner has no impact on the seek/inform ranking of any involved community member. The beacon sender (informer) who sends a "Zero Beacon" that results in a successful find, will obtain credit for initiating a Tip-Off. The beacon sender (informer) who merely "pulls away" from his/her spot gains no points regardless of whether the tipoff is successful.

Initially, a community member is provided with a monthly allotment of free seek requests, with a membership fee being charged after the community member has exhausted their monthly allotment. More specifically, membership begins, not with subscription, but with profile creation. Upon successful profile creation, a member is entitled to unlimited spot informs but only a limited amount of monthly spot requests. The system will inform a community member when they have reached their monthly allotment and ask if they would like to unlock unlimited seeks for the month. If the member responds affirmatively, then they will be billed a monthly fee that will in-turn unlock unlimited seek requests. This allows flexibility for those community members who may be traveling or who do not always reach their monthly free allotment. Regardless of subscription status, the participation rate of a community member remains active. In this way, community members can boost their participation score by informing even if they decide not to go beyond their allotment of free seek requests. The only way to discontinue community membership is to delete or deactivate a profile.

Figure 2:
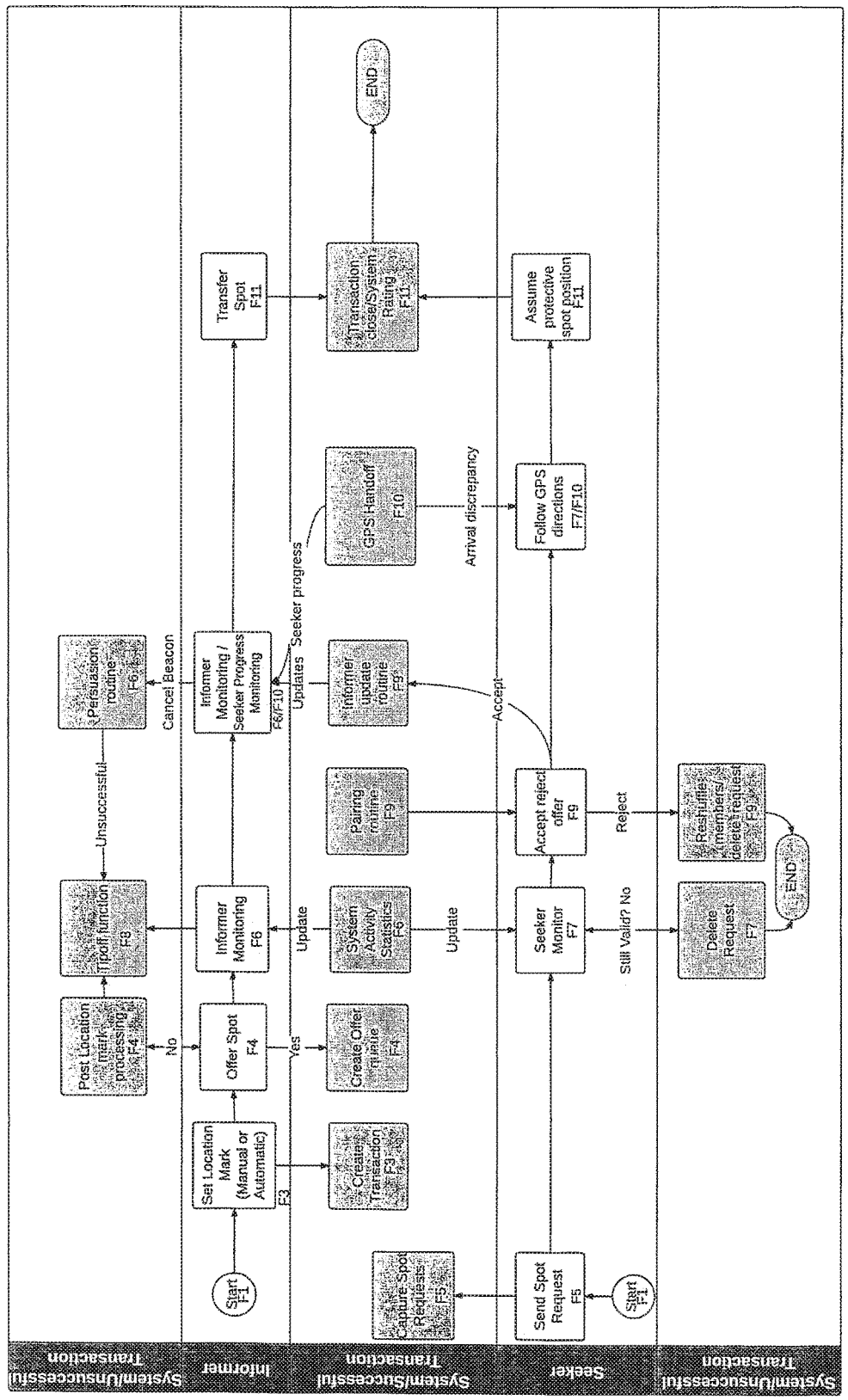
FIG. 2 is a swim lane diagram illustrating the interaction of a beacon sender (informer) with a requestor (seeker) in accordance with the invention.

FIG. 2 is an exemplary illustration of a swim lane diagram that shows the interaction of a beacon sender (informer) with a requestor (seeker) in accordance with the invention. A swim lane (or swim lane diagram) is a visual element used in process flow diagrams, or flowcharts that visually distinguishes job sharing and responsibilities for sub-processes of a process. Swim lanes may be arranged either horizontally or vertically. Overall, the system and method includes several processes, which can be performed individually or simultaneously. In the preferred embodiment, there are ten (10) functional processes, (i.e., F1 to F10), with a detailed description of each function being provided subsequently, and each of which are performed simultaneously with each other.

In general, the functions are as follows:
F1: Sign-in Function
(1) Pull/Create Profile;
(2) Check Status and enable the appropriate functions.
F2: Create/update Account/Profile Function
(1) Payment update/status info;
(2) Profile and defaults;
   (i) User Id,
   (ii) Tier number and awarded points,
   (iii) Automobile array
      a) Car make,
      b) Car Model,
      c) Car year, d) Car color,
e) Car size,
f) Default flag,
(iv) Desired spot array, i.e., "Sweet Spot Array"
   a) Nucleus coordinates
   b) Geographic Coordinates,
   c)
(v) Defaults,
   a) Radius from Nucleus,
   b) Spot type (Metered, Unmetered),
(v) Preferences,
   a) Reminder settings,
   b) Timer defaults.
F3: Location Marking Function
(1) Create Transaction,
(2) Award informer points.
F4: Beacon Casting Function
(1) Allow Location Mark delete,
(2) Create Beacon Queue,
(3) Allow modification of default settings (Time to parking spot),
(4) Set "Cast Beacon" credit flag.
F5: Parking Spot Requesting Function
(1) Check subscription status and monthly usage,
(2) Use profile to create spot request record.
F6: Informer status Function
(1) Allow Beacon to be deleted,
(2) Display transaction status,
(3) Track and display relevant counters.
F7: Seeker Status Function
(1) Allow Requests to be deleted,
(2) Display transaction status,
(3) Track and display relevant counters,
(4) Modify defaults for current transaction only.
F8. Tip-off Function
(1) Receive status update from informer/award credit,
(2) Predict status from informer/No further credit awarded,
(3) Identify and notify two (2) suitable seekers.

Analogous to the act of starting play at the beginning of a period with a jump ball, or a piece of confidential, advanced, or inside information. That is, "tip-off" has two meanings depending on the context in which it is used, where both meanings are relevant here.

F9: Pairing/System Status Function
(1) Attach and sort by timestamp, seeker requests to each beacon queue for which they are suitable,
(2) Identify matches,
(3) Communicate status to involved parties,
(4) Monitor timers,
(5) Extend offer to identified seeker,
(6) Update all queues based on seeker acceptance/rejection,
(7) Facilitate GPS Handoff.
F10: GPS Location Handoff Function
(1) Facilitate GPS Handoff within application,
(2) Display step by step directions to seeker,
(3) Display real time coordinates on map to offeror,
(4) Monitor timers.
F11: Transaction Close/Incentive update Function
(1) Facilitate GPS Handback,
(2) Determine parking spot switch,
(3) Collect User input,
(4) Send Seeker survey,
(5) Award/Subtract credits,
(6) Update databases and profile.

In detail, Function F1 sits "behind" a welcome screen that is displayed on the mobile device of a user. Function F1 handles authentication and provides an easy path to a profile update and creation screen. If a profile does not exist for a user, then this screen automatically directs the user to a create/update account Profile screen. If profile information does exist, Function F1 references the user profile information to determine whether an active Beacon or Location Mark exists. If a live or active beacon exists, then this function forwards the user to "Informer Status" Function F6. If an active Location Mark is encountered, then the user is passed on to the "Send Beacon" function F4. If neither an active Beacon nor a Location Mark exist, then the user is directed to a neutral screen where the user can begin either the seeking or informing process.

A user is directed to Function F2 if a profile does not exist or if the user's subscription status warrants it. This function can be accessed at any time through a settings icon provided on the GUI of the mobile device. This function allows users or community members to create or update account and profile information. A community member must have a profile to use the system. A community member's profile contains both unique user information as well as system default information.

As evident from its label, Function F3, marking a location creates a transaction record in the system that contains profile information and the car geographical location coordinates of the person who marked the parking spot. To provide accurate location coordinates, it is necessary to mark the location from the car while the parking spot is occupied by the car. Marking a location does not obligate the community member to inform the seekers within the community at a later time. Instead, location marking merely records the parking spot location, which provides a community member with the ability to "cast a beacon" (inform) at a later time. In other words, the "mark" establishes the spot; the "beacon" establishes the offer. After the mark is created, the system awards incentive points, and then commences a shutdown that is delayed by a predetermined time period. In preferred embodiments, the time period is 5 seconds or more. It should be noted community members can cancel the shutdown by selecting another function provided this selection occurs within the predetermined time period.

Casting a beacon allows the potential informer to become an active informer, which is identified in FIG. 2 as Function F4. In accordance with disclosed embodiments of the invention, a community member usually arrives at a "Cast Beacon" screen of the GUI (not shown) when he/she logs into the system, where an active location mark attached to his/her ID becomes detected. From this screen, the community member can either cast a beacon, delete the location mark or modify profile information. Casting a beacon is performed by merely pressing or activating a "Cast Beacon" button/icon on the GUI of the mobile device if the community member is satisfied with his default settings. If necessary, default settings (Type of spot, current car, spot availability estimate) can be modified before the "Cast Beacon" button or icon is pressed. After the beacon is cast, or the location mark is deleted, the system will automatically shut down after the predetermined time period has elapsed. It should be understood the communication member can cancel the automatic shutdown by selecting another function. An incentive flag is set indicating that a beacon was created. This and other flags will be examined at "Transaction close" (F10) to determine the amount of credits that should be awarded to this member's participation number.

Function F5, i.e., the Spot Requesting Function, can be reached from the Log-in neutral screen. If the community member's intent is to acquire a parking spot, then they select a "Request spot" button or icon. This button or icon can be selected immediately or the community member can adjust their default settings regarding their precise parking spot origin and search radius from the origin of the parking spot. By default, the parking spot origin is set to the coordinates of the seeker/requestor when they request a parking spot. Moreover, the community member can set the parking spot origin to a point on a map, an address or one of the "sweet spots" or preferred locations specified in their profile. The community member's profile is checked for subscription status. It should be understood a community member can "inform" indefinitely, regardless of subscription status. In this way, a community member can boost his/her participation number even as an unpaid subscriber. A seeker/requester, by contrast, is provided with a fixed number of successful "seeks" a month before they must subscribe to the service for that month. In preferred embodiments, the seeker/requester is permitted no more than 5 free "seeks" per month. Under the assumption the seeker is paid up for the month or below the acceptable number of free successful seeks, the system will accept the request for matching and then enable seeker status functionality.

Function F6 (Informer/Seeker status functionality) provides community members with timely status alerts that allows them to know where they fit in the parking spot transfer workflow. Stress reduction through an equitable parking spot transfer is a primary object of the instant invention. Accordingly, a well-timed, concise information scheme is a critical component of the experience provided by the system and method of the invention.

Pursuant to this, several assumptions are made with respect to the status of an informer. For example, i) status can be obtained through an "in app" private communication channel, or, for the offeror, the status can be turned off (or put into background mode) and notifications will arrive to the mobile device of the community member via a communication method, such as an SMS message, ii) status updates tell the informer if he/she has been matched, how to recognize the informer, how much time remains on his offer window, seeker calculated arrival time, and provides a notification so that the seeker can arrive at his/her car within his departure range, iii) the informer is also allowed to track the progress of the seeker on a map in real time, iv) a notice is sent to the offeror upon arrival of the seeker, and v) the informer can communicate directly, such as via SMS message, with the seeker.

It should be noted assumptions are also made with respect to the seeker/requester. These include, for example, i) the requirement for constant execution of the method in accordance with the invention in order for a seeker/requester to obtain status updates, i.e., there is no background mode. Based on the timestamp of the seeker/requester, the seeker is provided with information with respect to how long they have been in the system, ii) the seeker/requester is notified when a match has been found. The seeker/requester has a set time to accept the offer. If the seeker/requester does not accept the offer within the allotted time period, then the seeker/requestor is asked whether they wish to keep searching or wish to cancel the transaction. If the seeker/requester accepts the offer, then they are provided with specific information about the offeror as well as the exact geographical coordinates of the parking spot, iii) along with turn-by-turn instructions, which is technically outside of the status function, the seeker/requester is provided with an estimate for arrival along with a spot arrival range display, iv) upon arrival at the parking spot, the seeker/requester is provided with a notification that the offeror has also been notified. The seeker/requester can then monitor a "Departure range" countdown, or v) the seeker can communicate directly by SMS message with the offeror. It should be understood that although SMS messages are describes the communication protocol, other forms of communication are possible, such as email, MMS or IM.

Along with the informer and seeker/requester status assumption, there are also system status assumptions that must be taken into account, where each of the following timers and ranges are monitored, and status updates are visible or are sent to community members at predetermined intervals.

Offer Window Timer

This is the amount of time that a spot informer is obligated to wait for matching and seeker/requester arrival.

Departure Range

This is a time range that begins on seeker/requester arrival. The informer is required to arrive at his/her car and drive out of the parking space within this departure time range.

Acceptance Countdown

This is a time set by the system. Here, the seeker who is offered a spot has this amount of time in seconds to accept the parking spot. Preferable the acceptance countdown is 20 seconds.

Parking Spot Arrival Range

After being paired with a parking spot the seeker/requester is required to arrive at the parking spot and assume a "defensive" position within this time range.

Function F7 (Seeker Status Function) allows seekers/requesters to monitor activity in their area. Function F7 allows access to timers, as well as provides a seeker with the ability to cancel his/her request in the event that he/she finds a parking spot on his/her own. The seeker/requestor also has the ability to change certain parameters, such as search radius, after a request has been made.

Function F8 provides a Tip-off. Google™ defines a Tip-off as 1) a piece of information typically given in a discreet or confidential way, or 2) a jump ball that begins each period in a basketball game (used especially in reference to the first tipoff of the basketball game). In accordance with the disclosed embodiment, a tip-off is triggered when a determination is made that a significant probability exists that a spot, owned by a community member, will soon be released or has just been released. A system identified "likely spot" will trigger a tip-off, which is analogous to a jump ball in basketball, where the parking spot information is awarded to one or two seeking community members near the parking spot. The selection criteria are still evaluated but proximity is given priority to "timestamp" in a tip-off situation. A tip-off notification makes it clear that the existence of the parking spot is not certain and that by accepting the tip-off the seeker does not forfeit his/her place in the search queue.

The system and method of in accordance with disclosed embodiments are configured to acquire/sense certain events that may trigger the tip-off function. For example, a community member marked a location and then cancelled the mark, the community member marked a location, then offered the location but cancelled the offer before completing the pairing, or a community member with a "live" location mark or offer whose coordinates match the location mark and then moves to suggest vehicular motion.

Function F9 includes a pairing/system status functionality, where a pairing algorithm, which is essentially a first come first serve model in a two-tiered environment, is required to accomplish several objectives. Firstly, the pairing algorithm must take into account member parking preferences and needs, i.e., the pairing of should take into account preferences such as parking radius, parking type, "Sweet spot", and car size. A "Sweet spot" is a location designated by the seeker to be ideal. Seekers do not have to identify a sweet spot but if they do it may bump them ahead of a seeker who has almost identical results but for which the offer does not carry "Sweet spot" status. Secondly, the pairing algorithm needs to allow for irregularities in outcomes based on real world conditions, i.e., partial credit for good faith efforts that do not result in spot transfers. Lastly, the pairing algorithm needs to allow for special situations, such as two community members who want to trade exclusively with each other and are already in position.

The pairing algorithm in accordance with the invention is based primarily on a first come first serve model within a two-tier spot exchange platform. Beyond the "first come first serve" model, the pairing algorithm uses community member profile information to match one specific request to a specific offer. More specifically, the pairing algorithm evaluates all first-tier requests for spot range compatibility. Profile information of the seeker/requester, such as parking spot preference and car size, are then assessed in chronological order. If a suitable request is not located in tier-one, then all second-tier requests are examined using the same criteria. Upon identifying a match, the system notifies the seeker/requester, confirms acceptance, and then sends the exact coordinates of the parking spot to the seekers/requesters while simultaneously sending the arrival estimates of the seeker/requester to the informer. The seeker/requester can then utilize turn-by-turn instructions to locate the soon to be available parking spot while the informer is notified of or can monitor the of the progress seeker. There are special circumstances that are built into the algorithm. If, for instance, the system determines that a beacon and a request are sent from the same place at almost the same time, then the system can conclude that the informer and seeker are already aware of each other, parked alongside each other and would like to switch spots exclusively with each other. In this situation, the beacon and request are matched regardless of other seekers/requesters that are already in the queue.

Pursuant to implementation of the method in accordance with disclosed embodiments of the invention, certain assumptions are made with respect to the pairing algorithm. Firstly, seekers/requesters must be within their target seek range and must be able to reach any parking spot in their result set before the grace period starts. The reason for this requirement is that the system and method of the disclosed embodiments in accordance with the invention does not provide a reservation for a parking spot. Instead, active seekers/requestors are provided with assistance in procuring street parking.

Secondly, the system and method of the disclosed embodiments in accordance with the invention provides only one pairing opportunity per request, regardless of the number of parking spots that may be available. In this case, simplification and lower complexities provide less stress to a driver by eliminating the need to evaluate multiple spots while potentially in motion, which reduces the consumption of system resources. Moreover, providing multiple parking spot choices does not enhance the experience and, in fact, doing so may introduce unnecessary stress. Third, it is acceptable for a seeker/requester to accept a pairing assignment and then "break-off" if they find a suitable spot on the way to the system identified parking spot. As long as the seeker/requester cancels the request when it is safe to do so and before the end of the grace period, they will not incur the full cost associated with a successful pairing request. Lastly, after acceptance of a pairing offer the seeker gets step by step directions to the parking spot. The sender/informer gets real time updates by SMS messaging or on a map of the seekers whereabouts.

In accordance with the disclosed embodiments of the invention, the system and method keeps track of active offers and active seek requests. A result set is created for every seek request containing all parking spot offers, if any, that fit the request parameters. In accordance with the disclosed embodiments of the invention, a result set for each active offer is also created by the pairing algorithm. This result set contains all parking spot requests relevant to this offer. The system and method in accordance with disclosed embodiments of the invention sorts this result set by tier, spot preference, car size and timestamp. For each offer, the first seek request that satisfies these parameters is awarded a pairing offer. If the offer is accepted, then all result sets are updated and an attempt to match the next offer is performed by the pairing algorithm. If a pairing does not result in the successful transfer of the parking spot, then the seeker/requester may be reintroduced to the queue with their original time stamp. This has the effect of bumping the seeker/requester higher in the pairing queue. If a seeker/requester rejects the pairing offer, then the next seeker/requester in the queue is notified and the previous seeker/requester is eliminated from all pairing lists.

Function F10 (GPS Location Handoff Function) is invoked when a seeker and informer are connected. The GPS handoff is spanned within the parking app giving step by step instructions to the seeker/requester and visual location updates to the informer if the informer keeps the app running after a successful pairing. When the seeker arrives, the GPS system passes control back to inventive system in accordance with disclosed embodiments. Timers are updated and notifications are sent to the seeker and informer during this process. Notifications are sent to both parties when the coordinates of the seeker/requestor match the location mark associated with this transaction. This function allows both parties to comment on the transaction although neither is prompted to do so. A survey is then sent to the seeker, points are awarded and subtracted based on the incentive flags and necessary databases are then updated.

Function F11 (Transaction Close/Incentive Reconciliation Function) entails closure of a transaction. Specifically, this process takes an active transaction, i.e., a record that contains information about an offered parking spot and community members that were paired with the parking spot, and changes the status to one of a plurality of closing status options (e.g., "Complete" or "Cancelled"). By assigning a status of "Complete" or "Cancelled", the system removes the transaction from consideration, and converts the transaction into a historical document. A submitted survey triggers the successful completion of a transaction. It should be noted the transaction can be cancelled based on user action. At transaction close, the system also eliminates the associated participants from pairing queues. Moreover, all profile modifications are reset to default settings.

At close of a transaction, several activities may or may not be triggered depending on need and user action. For example, i) a survey is solicited of all spot awardees for transactions that reached the pairing stage and were not canceled, ii) if a survey is not submitted within a predetermined period of time but pairing occurred and all grace periods have expired, then the transaction will be closed. It will be assumed that a successful transaction occurred but a follow up survey will be sent. It should be noted the system always notes when the coordinates of the seeker/requester match the "Location mark" assigned to the transaction that they are paired to. If this does not happen after pairing it may initiate an investigation), iii) an administrative investigation could be initiated based on survey comments or request from one or both of the paired community members. As previously stated, an investigation may be triggered if the fact that the seeker never arrived at the marked location is recorded.

Figure 3:
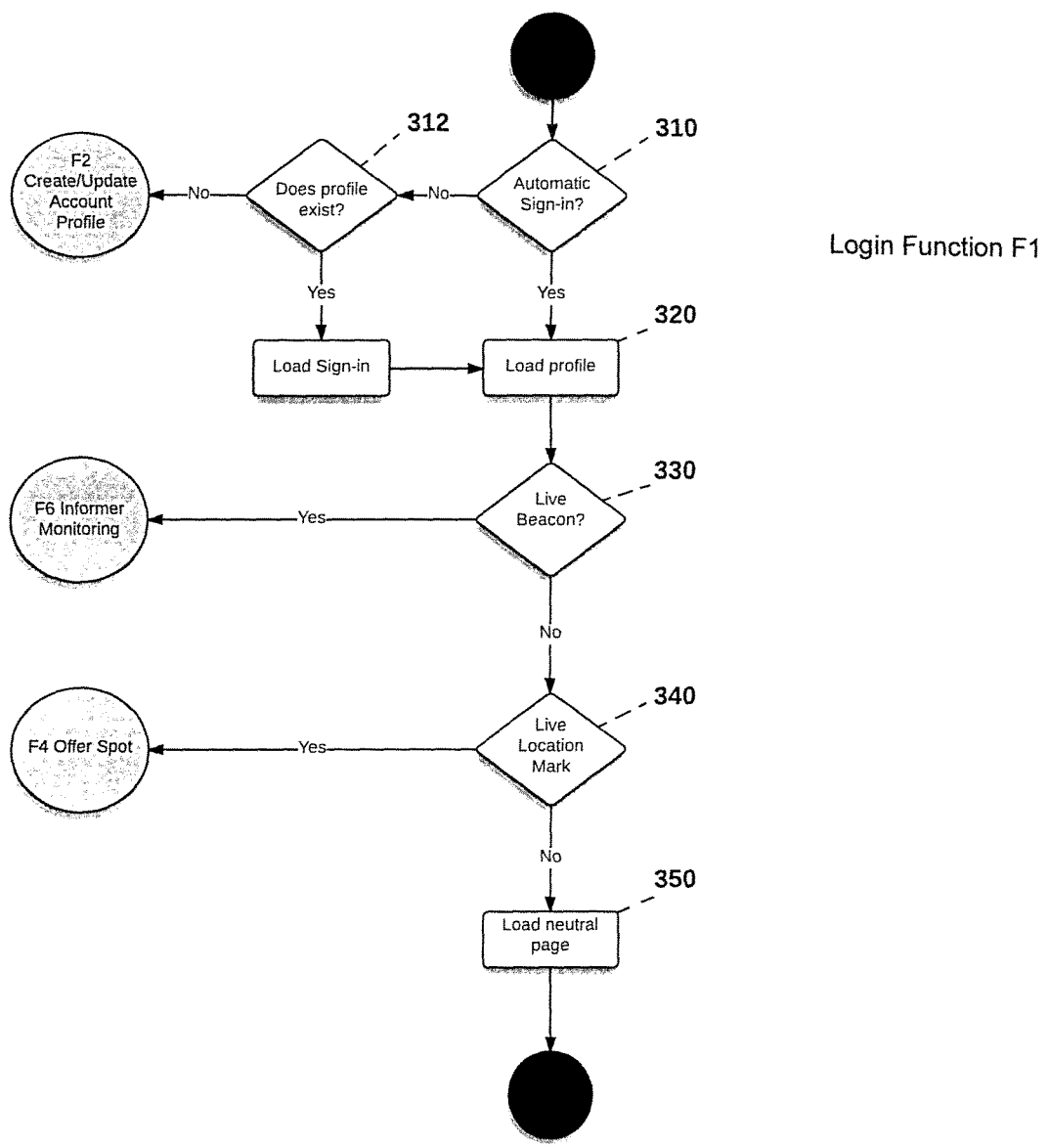
FIG. 3 is a flowchart illustrating the steps of the Login Function F1 in accordance with the invention.

FIG. 3 is a flowchart of the login function F1 in accordance with the invention. Initially, a user attempts to log-in to the system. A check is initiated to determine whether automatic sign-in should be performed, as indicated in step 310. If automatic sign-in should be performed, then the profile of a community member is loaded, as indicated in step 320. If automatic sign-in should not be performed, then a check is performed to determine whether the user profile exists, as indicated in step 312. If the user profile does not exist, then Function F2 is performed, where the user is offered the option to create an Account Profile. If the profile does exist, then sign-in performed, as indicated in step 315, and the method proceeds to step 320 where the profile of the community member is loaded.

A check is now performed to determine whether a "live" beacon is present, as indicated in step 330. If a live beacon is not present, then a check is performed to determine whether an active location mark is present, as indicated in step 340. If an active location mark is present, then Function F4 is performed to offer a parking spot. On the other hand, if an active location mark is not present, then a neutral screen is presented to the community member on the screen of their mobile device, as indicated at step 350.

Figure 4:
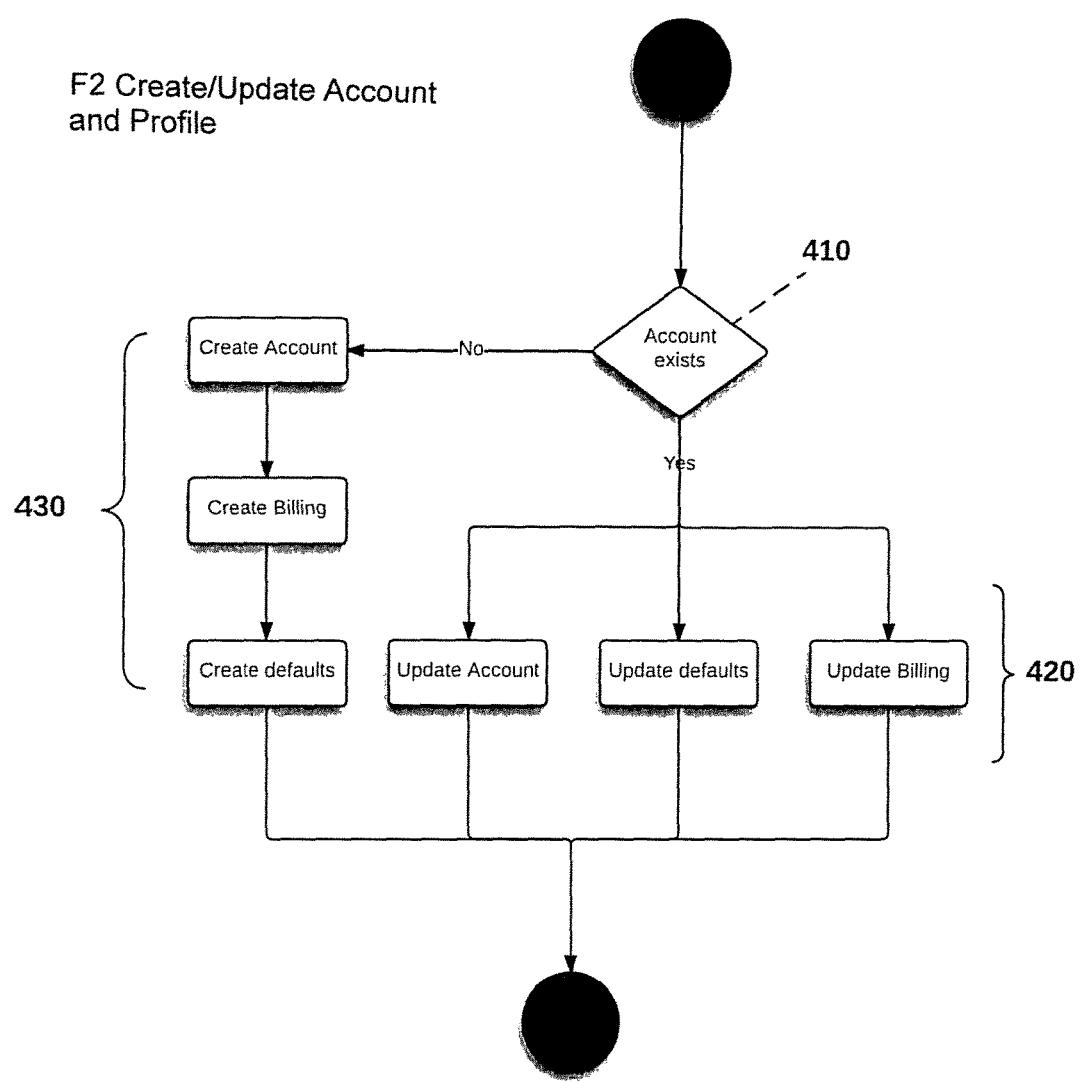
FIG. 4 is a flowchart illustrating the steps for the Create/Update Account and Profile Function F2 in accordance with the invention.

FIG. 4 is flowchart illustration the creation/update of an account profile in accordance with Function F2. Initially, a check is performed to determine whether an account exist for the user, as indicated in step 410. If an account exists for the user, then an update of the account is performed, as indicated in step 420. Here, parameters such as defaults and billing are updated. While "Update Account", "Update Defaults" and "Update Billing" are shown in FIG. 4, it should be understood that other account parameters can be updated and it is not the intent to be limited to only those shown in FIG. 4.

Continuing with FIG. 4, if an account does not exist for the user, then an account is created, as indicated in step 430. Here, parameters such as billing and defaults are created. Similarly, while "Create Account", "Create Defaults" and "Create Billing" are shown in FIG. 4, it should be understood that other account parameters can be created and it is not the intent to be limited to only those shown in FIG. 4.

Figure 5:
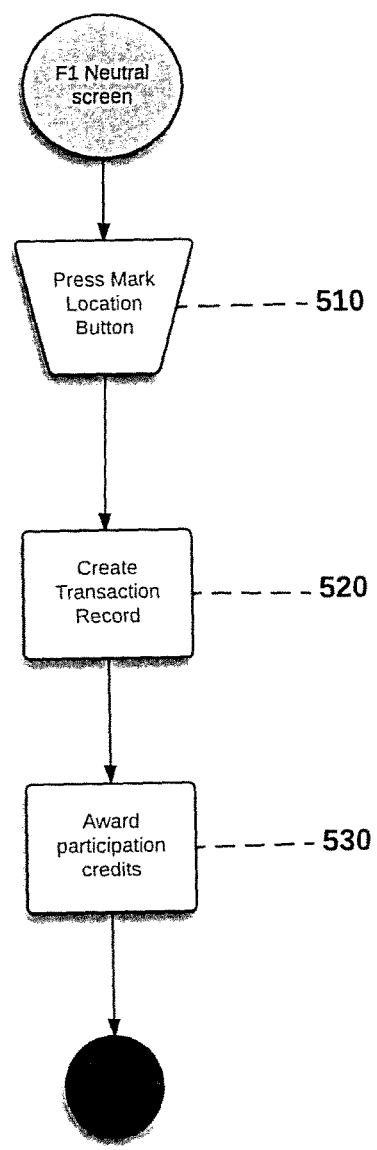
FIG. 5 is a flowchart illustrating the steps of the Location Marking Function F3 in accordance with the invention.

FIG. 5 is a flowchart of the Location Marking Function F3 in accordance with the invention. A community member initiates a location mark by pressing a button or touching an icon on the screen of his/her mobile device, as indicated in step 510. A transaction record is then created, as indicated in step 520. The participating community member is now awarded participation credits, as indicated in step 530.

Figure 6:
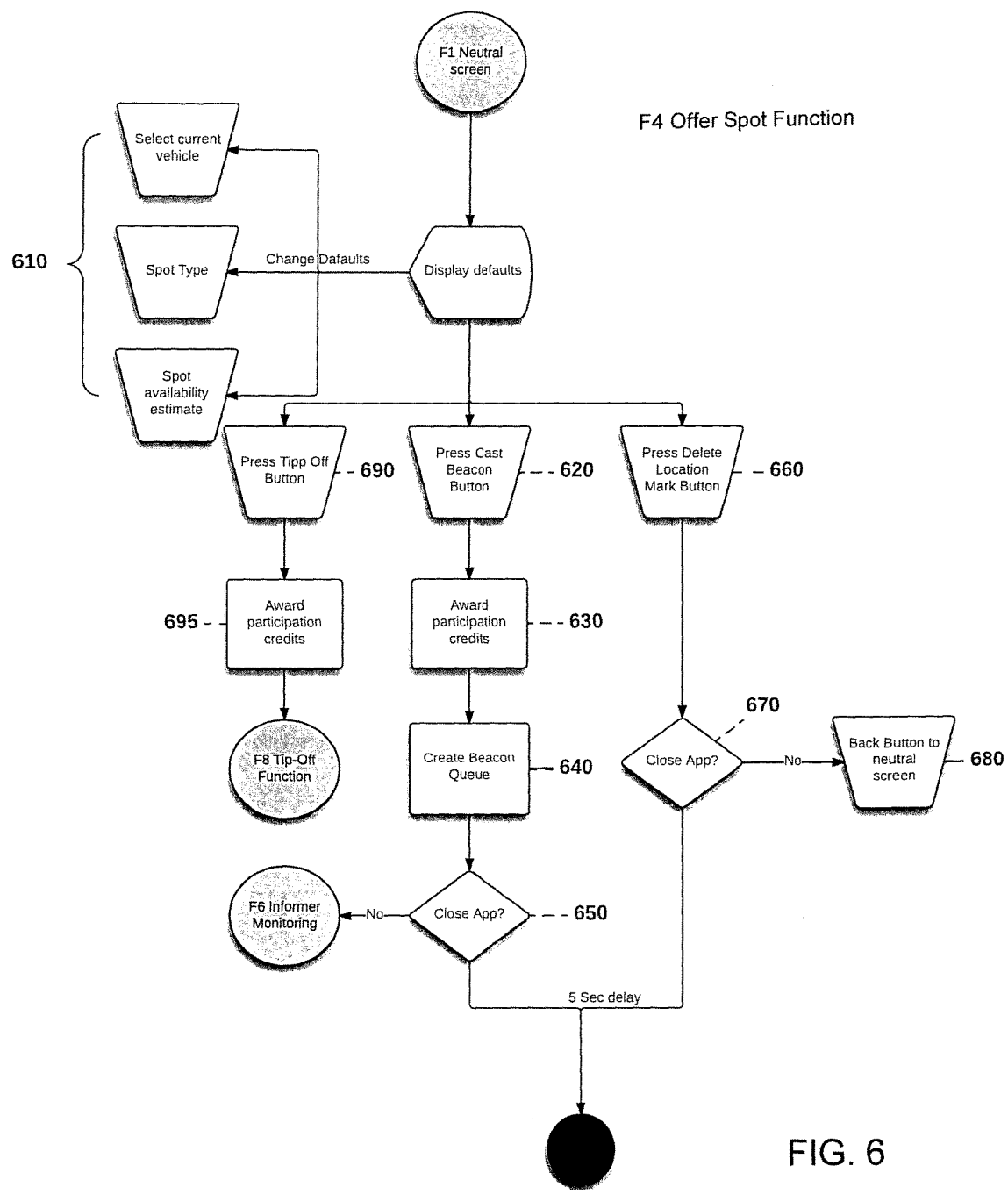
FIG. 6 is a flowchart illustrating the steps of Offer Parking Spot Function F4 in accordance with the invention.

Turning now to FIG. 6, shown therein is a flowchart of the Offer Parking Spot Function F4. The defaults available to an informer or community member offering a parking spot are displayed, as indicated in step 610. Here, the defaults can include parameters such as "select current vehicle", "parking spot type", and "spot availability estimate". From this screen, three options are available. In the first option, the informer "casts" a beacon, as indicated in step 620.

Next, the informer or beacon sender is awarded participation credits, as indicated in step 630. A beacon queue is then created, as indicated in step 640. In accordance with the invention, a beacon notification event (message) contains a certain number of message attributes:
UserID—Vanity ID,
GUID—Global Unique ID,
GeoCoordinates—Current location,
Current Date/Time Stamp—Coordinated Universal Time (UTC) when message was published (sent) to the millisecond unit (I.e. 030142016—1:10:00:000 PM),
Status—(A—active, E—expired, C—cancelled),
Current Vehicle type,
Parking Spot type, and/or
Spot Availability Estimate.

It should be understood that these attributes are merely exemplary and that the beacon can include other message attributes. Accordingly, it is not the intention to limit the beacon to only these disclosed exemplary attributes.

A check is now performed to determine whether the informer (beacon sender) wishes to exit the process, as indicated in step 650. If a request to exit the process is received, then a predetermined delay period is initiated and the process is terminated. If a request to exit the process is not received, then the Informer Monitoring Function F6 is performed.

Returning to the display defaults screen provided on the GUI of the mobile device, the informer (beacon sender) also has the option to delete an active, marked location, as indicated in step 660. Here, a check is performed to determine whether the informer (beacon sender) wishes to exit the process, as indicated in step 670. If a request to exit the process is received, then a predetermined delay period is initiated and the process is terminated. In preferred embodiments, the predetermined delay period is no less than 5 seconds. If, on the other hand, a request to exit the process is not received, then the neutral screen is presented as indicated in step 680. Here, the informer (beacon sender) can recommence the informing process.

Another option that is available from the display default screen is the ability to send a tip-off, as indicated in step 690. After a tip-off is sent, the informer (beacon sender) is awarded participation credits, as indicated in step 695. From this point, Tip-Off Function F8 is implemented.

Figure 7:
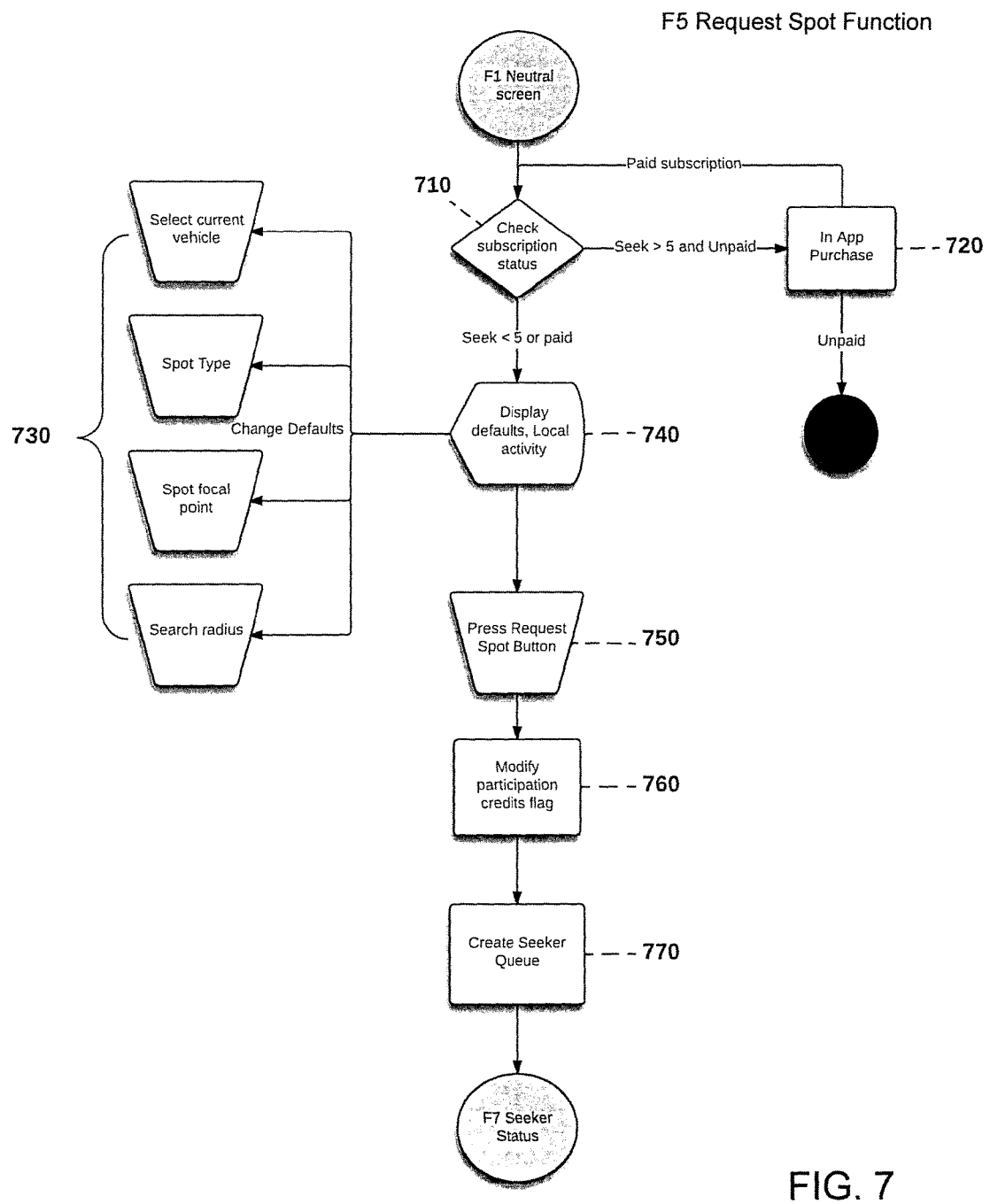
FIG. 7 is a flowchart illustrating the steps of the Request Parking Spot Function F5 in accordance with the invention.

FIG. 7 is a flowchart illustrating the Request Parking Spot Function F5 in accordance with the invention. A check is initially performed to determine the subscription status of a community member (i.e., a seeker/requester), as indicated in step 710. Here, the threshold is a predetermined number of seeks/requests which is preferable set to five (5). If the number of seeks/requests is greater than the predetermined number, then the community member is presented with the option to purchase a subscription so as to remain eligible to participate in the community, as indicated in step 720. If the community member chooses to remain an unpaid subscriber, then the process is terminated.

As shown in step 730, the defaults available to a seeker/requester are displayed, if the number of seeks/requests is less than the predetermined number or if the seeker/requester is a paid subscriber. Here, the defaults can include parameters such a "select current vehicle", "parking spot type", "spot focal point" and/or "search radius".

Next, the seeker/requester initiates a parking spot request, as indicated in step 740. A participation flag in the seeker/requester profile information is now modified, as indicated in step 750. Lastly, the seeker/requester queue is created, as indicated in step 760. From this point, Seeker Monitoring Function F7 is implemented. A parking spot request is a record that is sent from the seeker to the system and includes the seekers profile information such as "seeker identification", "seeker car characteristics" (e.g., make, model, year, color, size), "spot type desired", "spot search radius and focal point", "tier assignment" and "timestamp".

Figure 8:
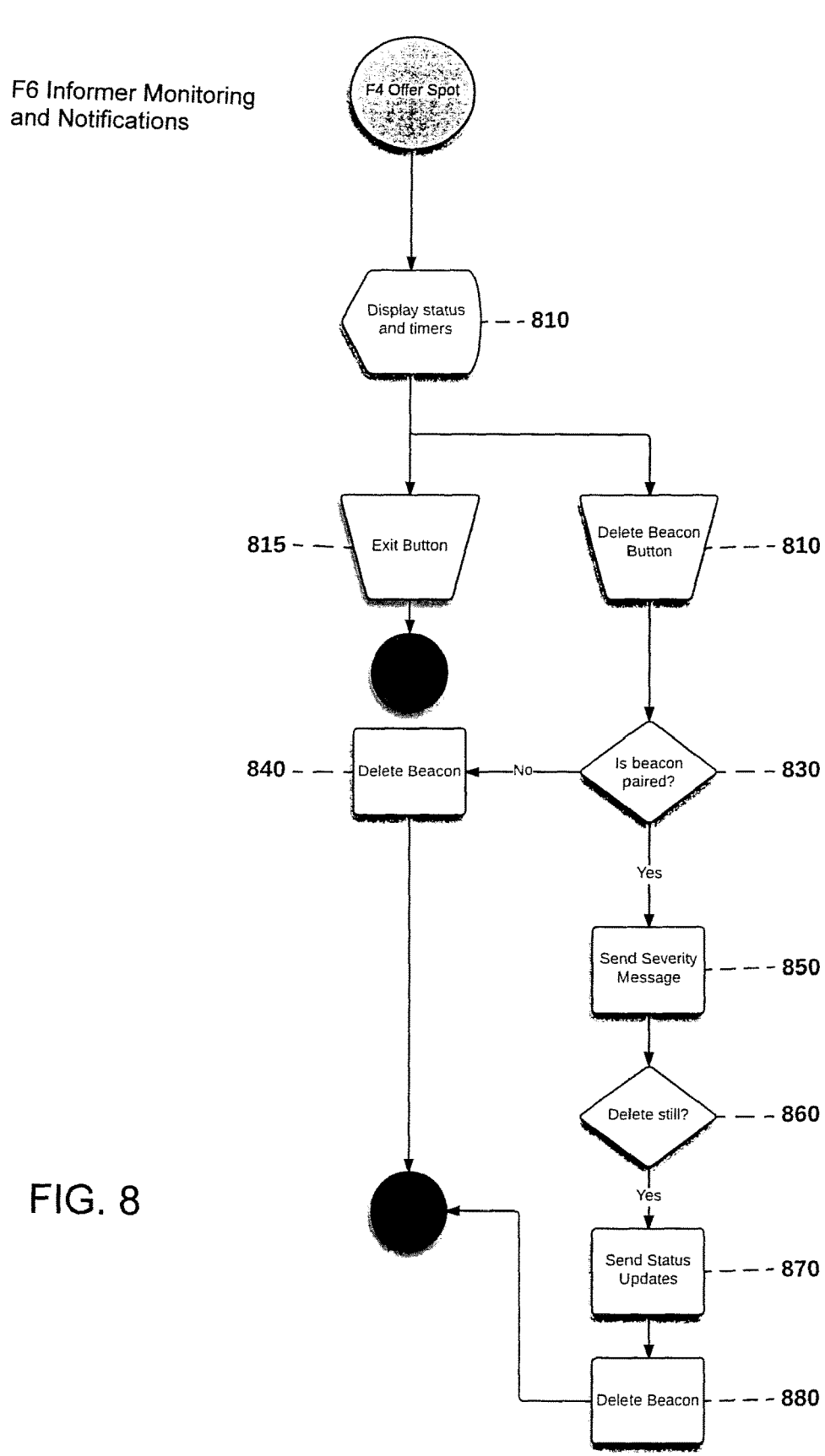
FIG. 8 is a flowchart illustrating step of the Informer Monitoring Function F6 in accordance with the invention.

FIG. 8 is a flowchart illustrating the Informer (Beacon Sender) Monitoring Function F6. Starting from the Parking Spot Offer Function F4, the community member is presented with a real time search and offer activity within the area in which the informer (beacon sender) is located. The status of the offer provided by the informer (beacon sender) (Paired, Unpaired) is also displayed, as well as a clock that indicates the time remaining before the informer is obligated to honor a match created in accordance with the disclosed embodiments of the invention, as indicated in step 810. A simple request from the informer (beacon sender) to exit the process will cause the informer to exit the application, as indicated in step 815. Nothing else changes and the informer will still be updated by SMS type text messages. All timers, status updates and pairing functionality will continue regardless of whether the informer is actively watching. On the other hand, the informer (beacon sender) can delete their beacon, as indicated in step 820. A check is then performed to determine whether the beacon to be deleted is already paired with a request from a seeker/requester, as indicated in step 830. If the beacon to be deleted is not paired with a request from a seeker/requester, then the beacon is deleted, the transaction record is updated and pairing queues are modified, as indicated in step 840. On the other hand, if the beacon to be deleted is paired with a request from a seeker/requester process, then a message is sent to the informer (beacon sender) pointing out the impact that such an action will have on a community member that is en route to the parking spot occupied by the informer or beacon sender, as indicated in step 850.

After sending the severity message, a check is performed to determine whether the informer (beacon sender) still wishes to terminate/delete the beacon, as indicated in step 860. Status updates are sent to the paired seeker/requester informing him/her of the change in status, as indicated in step 870. Here, the seeker/requester is returned to the active seek queue with their original time stamp intact. The beacon is now deleted and the process is terminated, as indicated in step 880.

Figure 9:
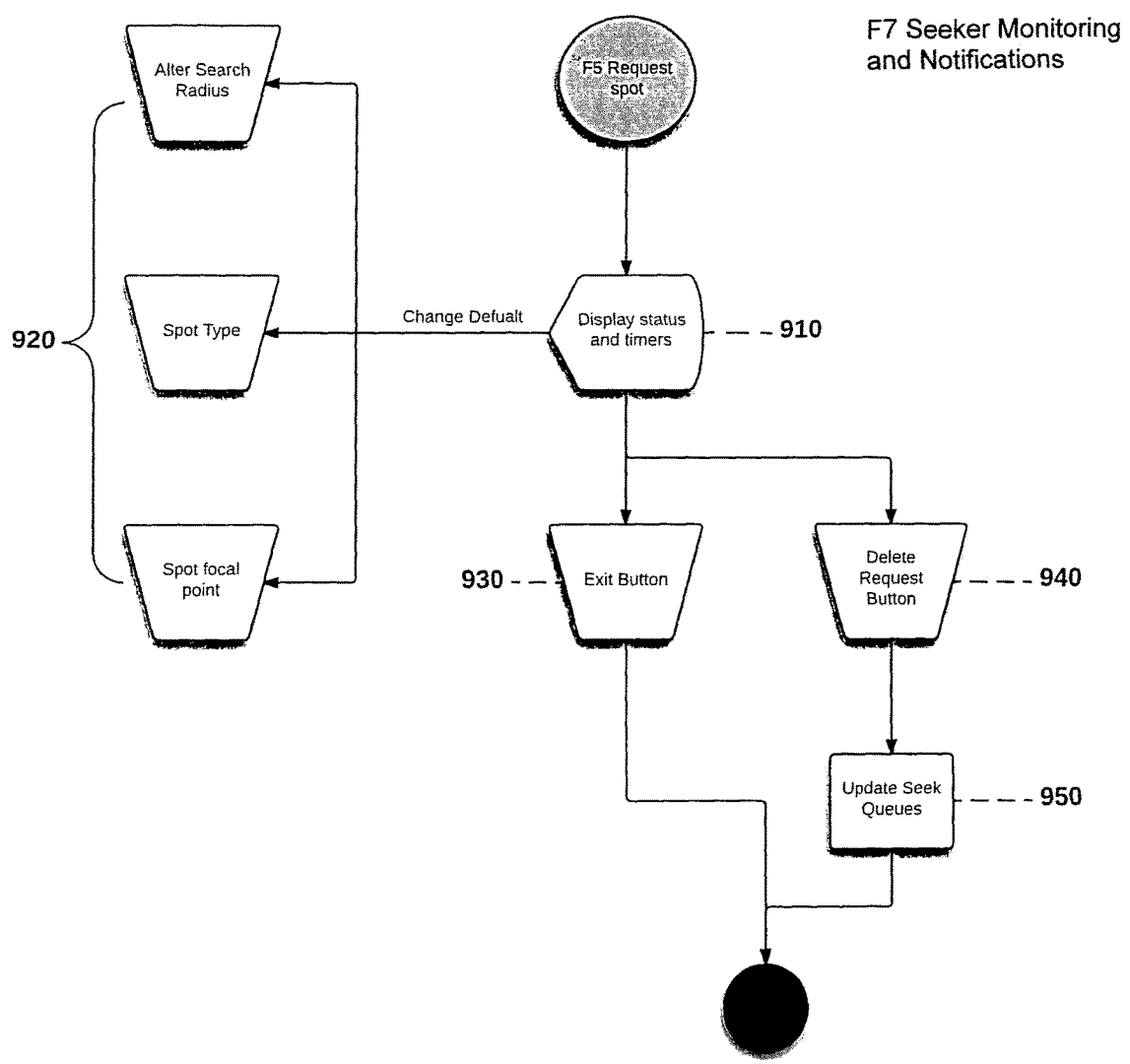
FIG. 9 is a flowchart illustrating the step of the Seeker Monitoring Function F7 in accordance with the invention.

FIG. 9 is a flowchart illustrating the Seeker Monitoring Function F7 in accordance with the invention. Commencing from the Request Parking Spot Function F5, the status and timers are display on the GUI on the mobile device of the community member, as indicated in step 910. From here, the community member has the option to perform different functions, such as alter their search radius, change the type of parking spot they may desire, or change the focal point of their parking spot, as indicated in step 920. In addition, the community member may merely press an exit button to leave the request process, which will cancel the request. The seeker should remain in the application as long as a match is desired. If the seeker presses the exit button a warning message will be sent, as indicated in step 930. Alternatively, the community member may activate a delete option whereby the parking spot request would be deleted, as indicated in step 940. All affected queues associated with the pairing engine (see FIG. 14) are updated to reflect the retracted request, as indicated in step 950.

Figure 10:
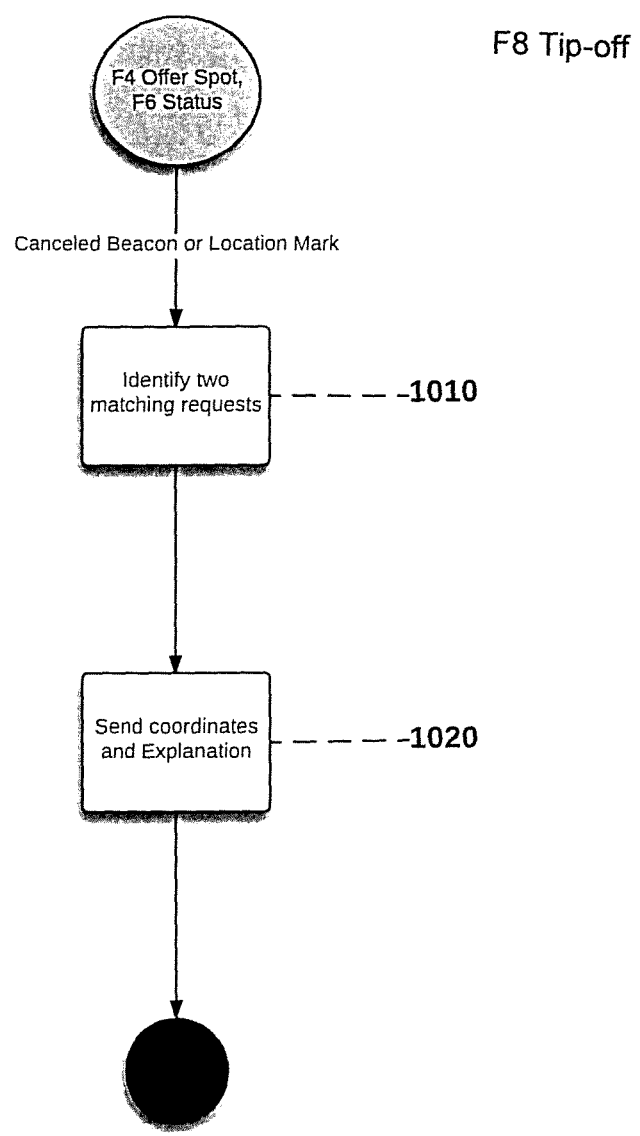
FIG. 10 is a flowchart illustrating the steps of the Tip-Off Function F8 in accordance with the invention.

FIG. 10 is a flowchart illustrating the Tip-Off Function F8 in accordance with the invention. Starting from either the Offer Parking Spot F4 or Status F6 Functions, no more than two suitable requests are identified, as indicated in step 1010. Next, parking spot coordinates and an explanation are sent to the identified suitable requestor/requestors with an explanatory note that it might be in their best interest to investigate but that there standing in the seek queue will not be altered until they delete their request, as indicated in step 1020.

Figure 11:
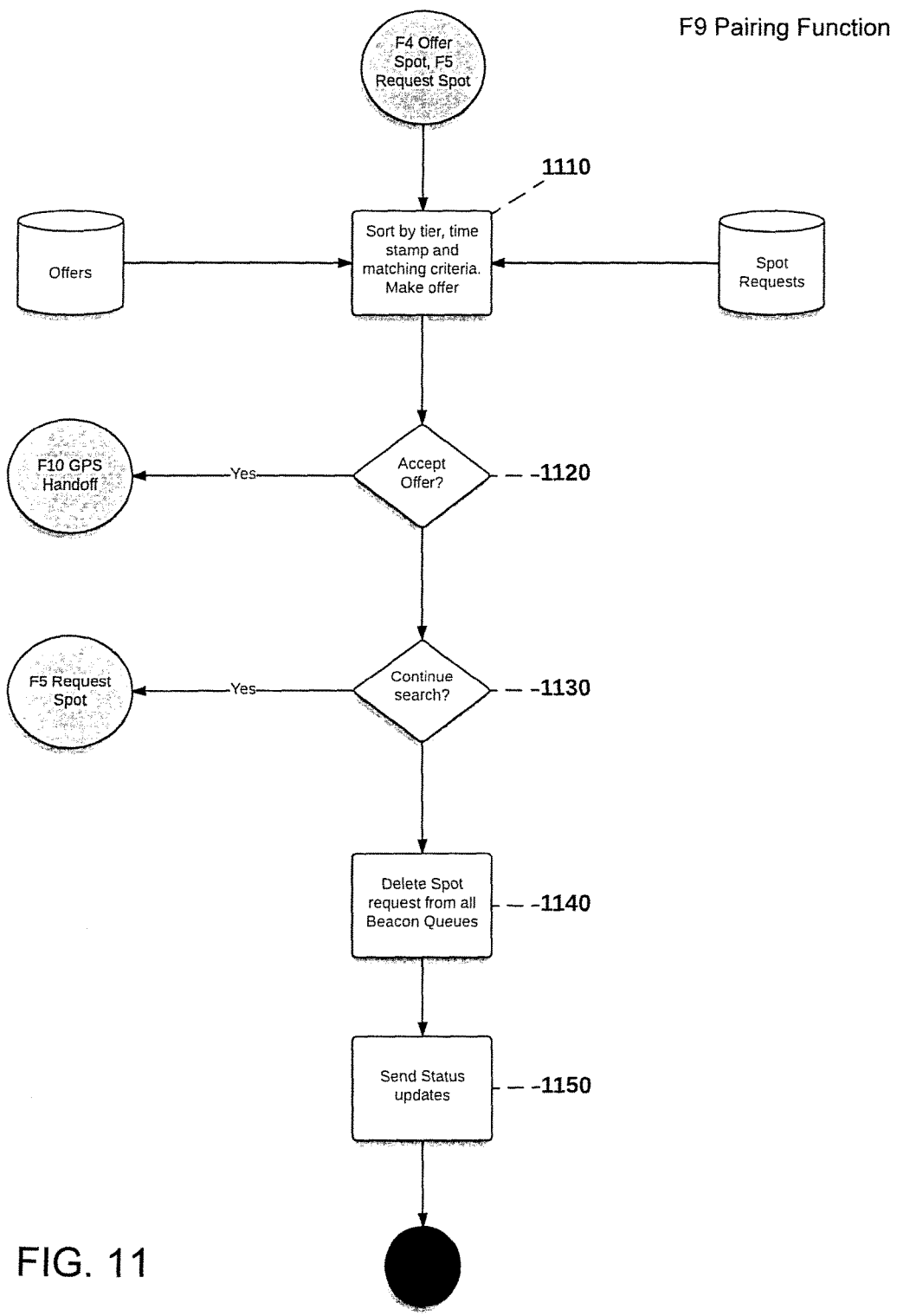
FIG. 11 is a flowchart illustrating the steps of the Pairing Function F9 in accordance with the invention.

FIG. 11 is a flowchart of the Paring Function F9 in accordance with the invention. Starting from either the Offer Parking Spot F4 or Request Parking Spot F5 Functions, a sort of incoming parking spot requests and parking spot offers is performed, as indicated in step 1110. A check is performed to determine whether a parking spot offer is accepted, as indicated in step 1120. If a parking spot offer is accepted, then Function F10 is performed.

If an offered parking spot is not accepted, then the seeker/requester is prompted to determine whether they wish to continue searching for a parking spot, as indicated in step 1130. If the seeker wishes to continue searching for a parking spot, then Function 5 is performed. That is, their request will continue to be evaluated against active beacons.

On the other hand, if the seeker/requester does not wish to continue searching for a parking spot or no response is received from the seeker/requester, then the parking request issued/generated by the seeker/requester is removed, as indicated in step 1140. At this stage, status update comprising a notice informing is sent to the seeker/requester their parking spot request has been deleted from the system is sent to the seeker/requester, as indicated in step 1150.

Figure 12:
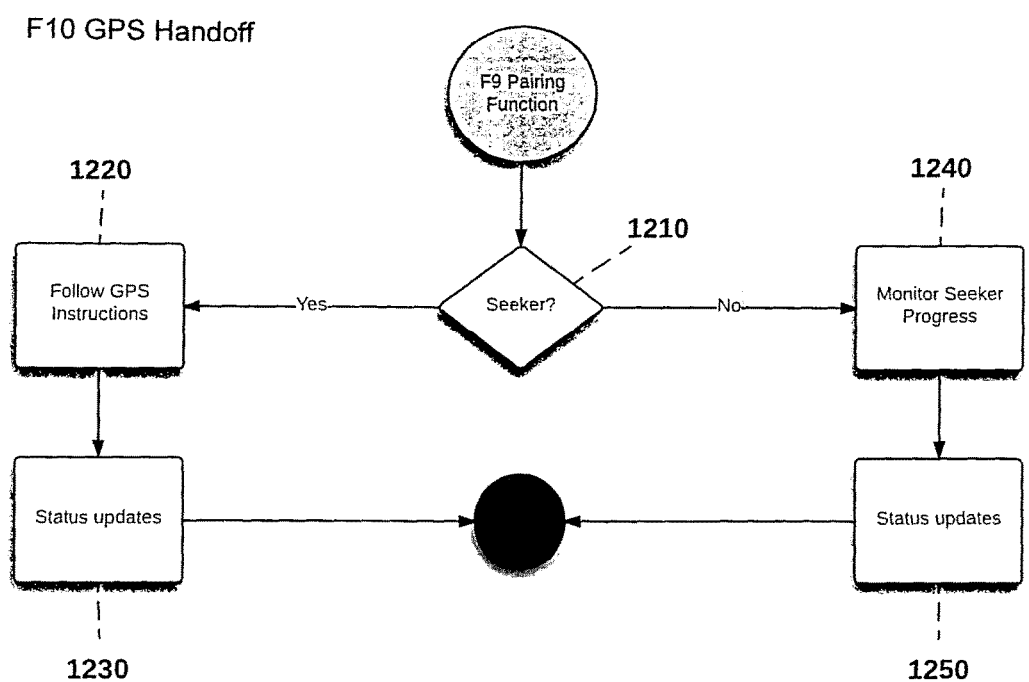
FIG. 12 is a flowchart illustrating the steps of the GPS Handoff Function F10 in accordance with the invention.

FIG. 12 is a flowchart illustrating the GPS Handoff Function F10 in accordance with the invention. A check is performed to determine whether seekers/requesters are present, as indicated in step 1210. If the community member is currently a seeker/requester, then the community member is presented with the GPS instructions that guide them to the parking spot that is being offered, as indicated in step 1220. Status updates are now provided, as indicated in step 1230. Here, arrival time as reported by the GPS system can be checked against the informer's obligation time window (which is a time range set by the system that indicates the range of time that the informer is obligated to hold the parking spot).

If, on the other hand, seekers/requesters are not present, then the system continually monitors for seekers/requesters, as indicated in step 1240. Status updates are now provided, as indicated in step 1250. In this case, when the offer obligation time limit (i.e., a predetermined amount of time in the future from the initial offer) is reached, a notification is sent to the informer indicating they can request an extension of the obligation limit or can cancel the offer. If the informer elects to extend the offer, then the offer alive is kept alive or kept active for a default extended amount of time. If the informer elects not to extend the offer, then the offer is rescinded and the transaction is closed and the beacon associated with the offer is eliminated from the offer queue associated with the pairing engine (see FIG. 14).

Figure 13:
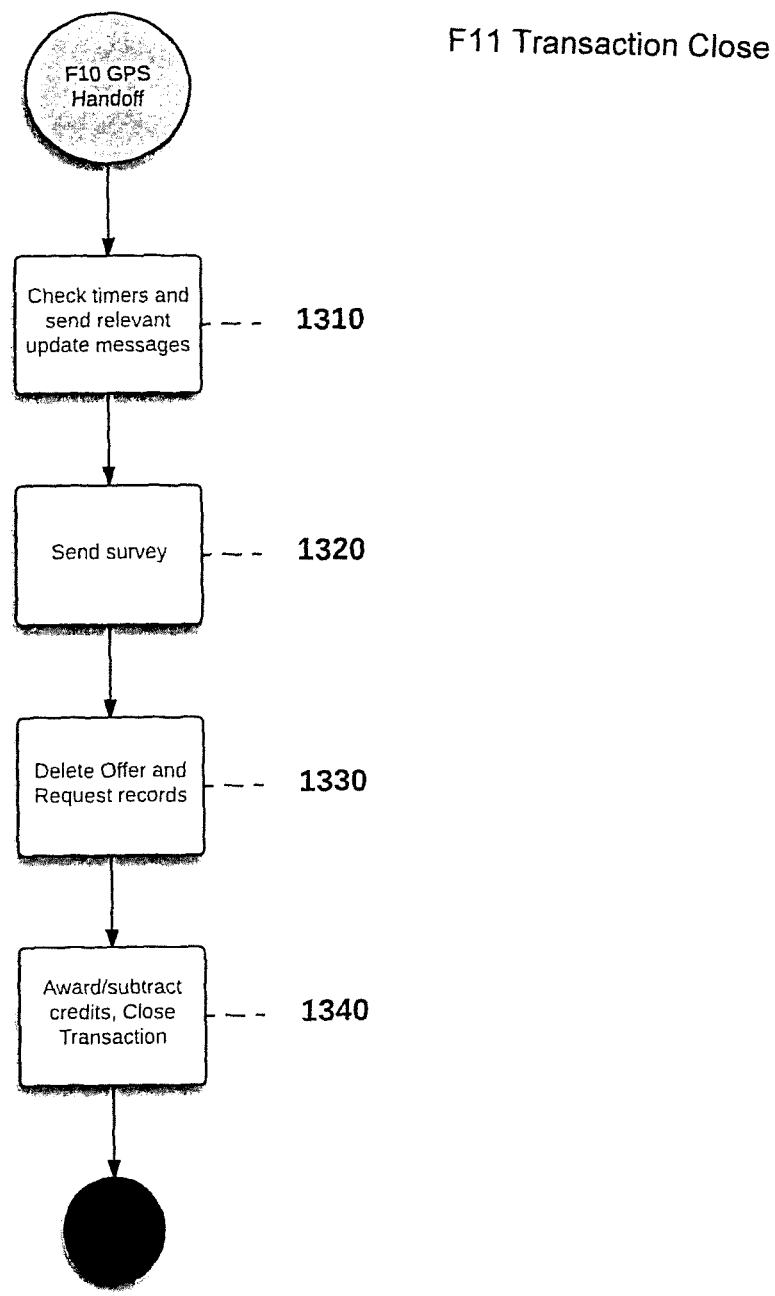
FIG. 13 is a flowchart illustrating the steps of the Transaction Close Function F11 in accordance with the invention.

FIG. 13 is a flow chart of a Transaction Close Function F11 in accordance with the invention. Starting from the GPS handoff function F10, both the seeker and informer are notified of the informer's parking spot hold obligation. This is a start and end time in which a spot transfer should be performed. This range is displayed as well as a clock which displays the remaining time available before the obligation time limit is reached, as indicated in step 1310. Next, a survey is sent to the community member, as indicated in step 1320. It is well known to send surveys to users to determine their satisfaction or displeasure with a particular service or consumer experience. Here, it should be understood the main point is not the actual information provided in the survey but, instead, the notion that the survey is sent.

Returning to the flowchart of FIG. 13, parking spot offers and requests are now deleted, as indicated in step 1330. Lastly, credits are awarded/subtracted from the community member's account and the transaction is closed, as indicated in step 1340.

Figure 14:
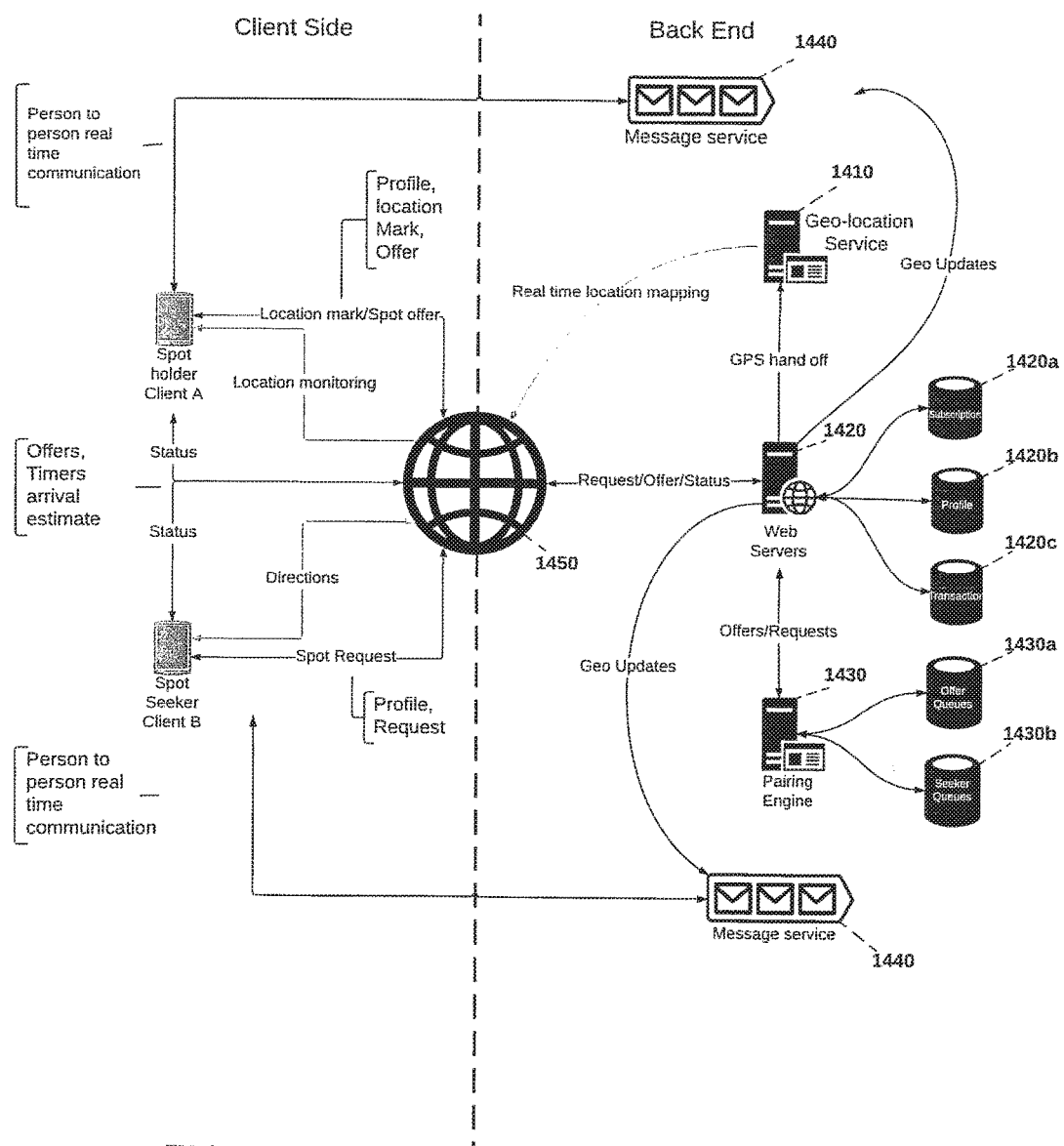
FIG. 14 is a schematic block diagram illustrating the back-end processing with respect to client side processing in accordance with the invention.

FIG. 14 is a schematic block diagram illustrating the back end processing with respect to client side processing in accordance with the invention. With reference to FIG. 14, parking spots are obtained in the following manner. If, within the community, a user (spot informer A or spot seeker B) has not established a profile, then they will do so to reflect the vehicle(s) that they drive, their default search radius, and their favorite spot location if appropriate. Upon establishing a profile, a request is then easily sent by pressing a "hot key" sequence or pressing a "request spot" button provided on a graphical interface ("GUI") of a mobile device. The profile information of the user is stored at webserver 1420 in profile database 1420b. Also stored in the webserver 1420 is subscription information 1420a associated with each user or community member.

In accordance with invention, all informer beacons whose locations fall within an established seek radius are identified. Parking spots are assigned to parking spot requesters/seekers B based on a matching methodology that considers tier, queue position, car size, parking spot requester/seeker time in relation to a parking spot availability estimate, as well as other variables.

The system informs the parking spot requester/seeker of a match and the requestor/seeker manually accepts or rejects the offer. If the requestor/seeker accepts the match, then turn-by-turn instructions are provided to the parking spot. Here, it should be noted it is the requestor's/seeker's B responsibility to arrive at the designated parking spot by a stated vacate time. For this reason, requests that are forwarded over the network 1450 are preferably made only when the requestor B is physically close enough to the requesting radius to travel to a parking spot should one be assigned.

It is contemplated that a parking spot requestor may accept a spot but then find another parking spot on the way to their requested spot. Therefore, if a requestor decides to take another parking spot then, as soon as it becomes feasible, the requestor releases their requested parking spot for reassignment. Release of the parking spot also removes the requestor from the spot seeking queue 1430b maintained in the pairing engine application server 1430 to ensure assistance is no longer needed before their place in the seeker queue 1430b is relinquished.

The method and system of the invention accommodates situations in which a beacon is sent out and a match is obtained, but the seeker never shows to claim the parking spot. This is accounted for as follows. Once a beacon has been accepted, a sender A becomes obligated to hold the spot through the length of time associated with a transfer grace period. The method and system of the invention allows a sender/informer B to track the requester/seeker A that accepted the issued beacon. Based on the location of the requestor A, a beacon sender B (informer) may decide to hold the parking spot beyond the transfer grace period but they are not obligated to do so. If the vacate time arrives and expires and the requester/seeker fails to arrive, then credit will be provided to the beacon sender (informer B) for their attempt to inform the community about a spot even though a transfer failed to occur. That is, if the community member held their parking spot through the transfer grace period and the driver has not shown, then the community member may pull away from their parking spot with the understanding they will obtain credit for a successful inform. This credit information is stored at the webserver 1420 in association with the profile 1420b of the parking spot holder A.

In general, there is a preferred way to inform others about a parking spot that is about to become vacate. Ideally the beacon sender (informer B) should not wait until arriving at their car to send the beacon. Beacons should be sent before returning to the car but not until making a reasonably accurate estimate of departure time. Thus, the recommended approach is to send a beacon as soon as it becomes possible to approximate a departure but before the actual need to proceed to the vehicle. Preferably, a beacon is sent, and the beacon sender (informer B) gradually proceeds to their car, where a community member (seeker/requestor A) is already queued up waiting for the parking spot. After an exchange of acknowledgements, followed by a parking spot transfer, both parties (A, B) can then proceed on their way.

There are instances in which a beacon is sent, but no response occurs. This can occur depending on the time of day or location. Here, however, the method and system has a built in incentive program, whereby if the beacon is kept open for a minimum live beacon period then the beacon sender (informer B) is awarded points for making the effort. The amount of points gradually diminishes with the frequency of non-response beacons.

Only a seeker/requestor A who has been paired to a beacon obtains detailed information associated with that beacon. All other community members see real-time seek and beacon activity on their dashboards or GUI on their mobile device. The dashboard or GUI will show community members how many active beacons and requests are in play at any one moment in time for their target area. From this information, community members can derive the activity level of the community within the target search radius. The dashboard or GUI will hint at spot movement activity in the target area and provide specific information about pairing odds.

Parking spots are assigned in accordance with a matching algorithm that matches beacons with spot requestors/seekers. Essentially, this is a first come first serve model but the system keeps track of both tiers and evaluates first tier requests before considering second tier requests. The system also takes into account user profiles stored in the profile data bases 1420b at the web servers 1420. If, for instance, a beacon was sent out by a community member driving a Mini cooper and the only first tier seeker happens to be driving a Chevy Suburban but a second tier member is driving a Chevy Volt, the system is biased to award the parking spot to the Chevy Volt driver even though the first tier request was initially considered. Community members can also specify a favorite spot referred to as a "Sweet spot". Sweet spots represent the requesters "dream" or most optimal spot and should not change often. If a community member has specified a sweet spot and the beacon contains the same coordinates, the matching algorithm may provide preferential treatment to that community member.

With respect to the spot holder A, profile information residing on the profile database 1420b is furnished at logon by an application residing on the Webserver 1420 and passed to the spot holder through the public cloud 1450. The webserver/application server 1420 is used to interface with the clients A, B, provide business logic and store profile, transaction and account/subscription information. A public cloud is one based on a conventional cloud computing model, in which a service provider makes resources, such as applications and storage, available to the general public over the Internet. With continued reference to FIG. 14, immediately after parking, the spot holder A "Marks" the location of his/her car (see FIG. 5; Function 3). Location coordinates are then sent via the public cloud 1450 to the webserver 1420 where they reside on transaction database 1420c.

If the spot holder A decides to offer the spot (FIG. 6; Function 4), then default information, which can be modified locally, is passed through the public cloud 1450 to the webserver 1420. The default information is then forwarded to the pairing engine 1430. An entry is now added to offer queue 1430a by Pairing Engine Application Server 1430. The Pairing Engine Application Server 1430 is an Application server used to collect offers and seeks and create matches that are then offered to the seeker for acceptance.

Status updates of parameters, such as system timers, acceptances, progress notifications, can come from the webserver 1420 via the public cloud 1450 or they can come from the webserver 1420 via the message service 1440 depending on user preference.

After an offer for a parking space is extended via the system in accordance with the invention and accepted by the seeker (Client B), the Spot holder A receives location updates via either the webserver 1420 over the public cloud 1450 or from the webserver 1420 by message services 1440, again depending on user preference. After a successful pairing Client A and Client B can communicate directly with each other through message service server 1440. These message service servers 1440 are used between a paired spot holder A (offeror) and spot seeker B to perform real-time communications with each other.

With respect to the spot holder A, profile information residing on the profile database 1420b is furnished at logon by the application residing on the webserver 1420 and passed to the Client B through the public cloud 1450.

With the profile 1420b and current location information, the spot seeker (Client B) sends a parking spot request over the public cloud 1450 to the application on the webserver 1420. The webserver 1420 then sends the parking spot request to the pairing engine 1430 where an entry is added to the seeker queue 1430b.

Status updates of parameters, such as system timers, "offer", progress notifications or tip-offs, can come from the webserver 1420 via the public cloud 1450 or the status updates can come from the webserver 1420 via the message service router 1440 depending on user preference.

After the seeker B accepts the offer for the parking spot, geo-location services 1410 are called so as to provide the seeker B with step-by-step for traveling to the available parking spot. The geo-location service is typically provided by a 3rd party, and reached through API calls to provide real-time geo-location tracking and monitoring. After a successful pairing, the spot holder A and seeker B can communicate directly with each other via message service server 1440.

Upon successful transference of the parking spot, the Client B will receive a survey from webserver 1430 via the public cloud 1450 for completion. This survey is submitted via the public cloud 1450 to the webserver 1430 were the transaction record 1430c notes the survey information and closes the transaction.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for distributing parking location information via a social platform to community members of the social platform to enable community members to acquire a parking spot, the method comprising:
   marking, by an informer from within the community members, a parking spot geographical location;
   transmitting, by the informer, a beacon including information identifying the geographical location of the marked parking spot to a web server;
   sending the transmitted beacon from the web server to a pairing engine, the beacon being placed in an offer queue within the pairing engine;
   sending, by a parking spot seeker from within the community, a request for a parking spot to the web server;
   sending the request for the parking spot from the web server to the pairing engine, the request for the parking spot being placed in a seeker queue;
   evaluating, at the pairing engine, relevant parking spot seeker requests for parking spots with respect to beacons in the offer queue to identify matches to specific criteria within the beacons and specific criteria within the parking spot seeker requests;
   sending an offer for the parking spot to the seeker from within the community when the request for the parking spot which matches the specific criterion is identified;
   determining whether the parking spot seeker from within the community has accepted the offer for the parking spot;
   sending from the pairing engine, via the web server, the geographical location of the accepted parking spot to the parking spot seeker from within the community if the parking spot seeker from within the community accepts the offer;
   sending a notification to the parking spot seeker from within the community which accepted the offer for the parking spot when the beacon within the offer queue at the pairing engine is canceled by the informer: and
   maintaining the parking spot seeker from within the community in the seeker queue at an unchanged location in the seeker queue.

2. The method of claim 1, further comprising:
   utilizing turn-by-turn instructions provided to the parking spot seeker from within the community based on the geographical location of the marked parking spot to travel to the accepted parking spot;
   wherein the informer receives profile information associated with the parking spot seeker from within the community, the informer receiving real-time information associated with progress of the parking spot seeker from within the community.

3. The method of claim 1, wherein the parking spot seeker from within the community is provided with a time period in which to arrive at the accepted parking spot.

4. The method of claim 3, further comprising:
determining whether the parking spot seeker from within the community has arrived at the accepted parked spot based on a geographical location of the parking spot seeker from within the community matching the geographical location of the accepted parking spot prior to expiration of the time period in which to arrive at the accepted parking spot;
initiating a time delay; and
sending a notification indicating a successful transfer to the informer and the parking spot seeker from within the community.

5. The method of claim 3, further comprising:
determining whether the parking spot seeker from within the community has arrived at the accepted parked spot based on a geographical location of the parking spot seeker from within the community matching the geographical location of the accepted parking spot prior to expiration of the time period in which to arrive at the accepted parking spot;
sending a query to the parking spot seeker from within the community if the parking spot seeker from within the community fails to arrive at the accepted parked spot prior to expiration of the time period in which to arrive at the accepted parking spot;
deleting the request from the seeker queue, deleting the beacon from the offer queue, and ending a parking spot acquisition if the parking spot seeker from within the community indicates a parking spot is no longer required; and
maintaining the request for the parking spot in the seeker queue and deleting the beacon from the offer queue, and ending the parking spot acquisition if the parking spot seeker from within the community indicates a parking spot is still required.

6. The method of claim 1, wherein said marking the parking spot geographical location comprises creating a transaction record in transaction data of the web server, said transaction record containing profile information and a vehicle location geographical coordinates of the informer which marked the parking spot.

7. The method of claim 1, wherein the beacon comprises at least one of UserID information, a Global Unique ID (GUID), GeoCoordinates, a Current Date/Time Stamp, a Current Vehicle type, a Parking Spot type and a Spot Availability Estimate.

8. The method of claim 1, further comprising:
issuing, by the informer, a tip-off to at least one parking spot seeker within the seeker queue at the pairing engine when a beacon is canceled.

9. The method of claim 8, wherein the tip-off is issued to two parking spot seekers.

10. A method for distributing parking location information via a social platform to community members of the social platform to enable community members to acquire a parking spot, the method comprising:
marking, by an informer from within the community members, a parking spot geographical location;
transmitting, by the informer, a beacon including information identifying the geographical location of the marked parking spot to a web server;
sending the transmitted beacon from the web server to a pairing engine, the beacon being placed in an offer queue within the pairing engine;
sending, by a parking spot seeker from within the community, a request for a parking spot to the web server;
sending the request for the parking spot from the web server to the pairing engine, the request for the parking spot being placed in a seeker queue;
evaluating, at the pairing engine, relevant parking spot seeker requests for parking spots with respect to beacons in the offer queue to identify matches to specific criteria within the beacons and specific criteria within the parking spot seeker requests;
sending an offer for the parking spot to the seeker from within the community when the request for the parking spot which matches the specific criterion is identified;
determining whether the parking spot seeker from within the community has accepted the offer for the parking spot;
sending from the pairing engine, via the web server, the geographical location of the accepted parking spot to the parking spot seeker from within the community if the parking spot seeker from within the community accepts the offer;
determining whether the parking spot seeker from within the community has arrived at the accepted parked spot based on a geographical location of the parking spot seeker from within the community matching the geographical location of the accepted parking spot prior to expiration of a time period in which to arrive at the accepted parking spot;
sending a query to the parking spot seeker from within the community if the parking spot seeker from within the community fails to arrive at the accepted parked spot prior to expiration of the time period in which to arrive at the accepted parking spot;
deleting the request from the seeker queue, deleting the beacon from the offer queue, and ending a parking spot acquisition if the parking spot seeker from within the community indicates a parking spot is no longer required; and
maintaining the request for the parking spot in the seeker queue and deleting the beacon from the offer queue, and ending the parking spot acquisition if the parking spot seeker from within the community indicates a parking spot is still required;
wherein the parking spot seeker from within the community is provided with the time period in which to arrive at the accepted parking spot.

* * * * *